(12) United States Patent
Vachharajani et al.

(10) Patent No.: US 9,008,102 B2
(45) Date of Patent: Apr. 14, 2015

(54) REDUNDANCY OF NETWORK SERVICES IN RESTRICTED NETWORKS

(71) Applicant: F5 Networks, Inc., Seattle, WA (US)

(72) Inventors: Manish Vachharajani, Lafayette, CO (US); John Giacomoni, Longmont, CO (US)

(73) Assignee: F5 Networks, Inc., Seattle, WA (US)

( * ) Notice: Subject to any disclaimer, the term of this patent is extended or adjusted under 35 U.S.C. 154(b) by 64 days.

(21) Appl. No.: 13/745,074

(22) Filed: Jan. 18, 2013

(65) Prior Publication Data

US 2013/0182714 A1   Jul. 18, 2013

Related U.S. Application Data

(60) Provisional application No. 61/587,898, filed on Jan. 18, 2012.

(51) Int. Cl.
*H04L 12/28* (2006.01)
*H04L 12/721* (2013.01)
*H04L 12/24* (2006.01)
*G06F 11/07* (2006.01)
*G06F 11/14* (2006.01)
*G06F 11/20* (2006.01)
*G06F 11/34* (2006.01)

(52) U.S. Cl.
CPC .......... *H04L 45/44* (2013.01); *H04L 41/0813* (2013.01); *G06F 11/0793* (2013.01); *G06F 11/0709* (2013.01); *G06F 11/1438* (2013.01); *G06F 11/1482* (2013.01); *G06F 11/2035* (2013.01); *G06F 11/3433* (2013.01)

(58) Field of Classification Search
CPC ............................ H04L 45/44; H04L 41/0813
USPC ................................................. 370/400, 396
See application file for complete search history.

(56) References Cited

U.S. PATENT DOCUMENTS

| | | | |
|---|---|---|---|
| 2002/0120741 A1* | 8/2002 | Webb et al. | 709/225 |
| 2005/0193105 A1* | 9/2005 | Basham et al. | 709/223 |
| 2012/0182866 A1* | 7/2012 | Vinayagam et al. | 370/228 |

* cited by examiner

*Primary Examiner* — Sai-Ming Chan
(74) *Attorney, Agent, or Firm* — Holland & Hart LLP

(57) ABSTRACT

Methods, systems, and devices are described for managing virtual network services provided to a network. Network services may be provided to a client network having a first network fabric at a self-contained network services system implementing a number of redundant instances of a network service application. The self-contained network services system may have a second network fabric. The second network fabric may be adapted to distribute network service tasks received from the client network which are associated with the network service application among the redundant instances of the network service application.

21 Claims, 29 Drawing Sheets

REDUNDANCY OF NETWORK SERVICES IN RESTRICTED NETWORKS

CROSS-REFERENCE

The present application claims priority under 35 U.S.C. §119 to U.S. Provisional Patent Application Ser. No. 61/587,898, entitled "VIRTUAL NETWORK SERVICES," which was filed on Jan. 18, 2012, the entirety of which is incorporated by reference herein for all purposes.

BACKGROUND

Aspects of the invention relate to computer networks, and more particularly, providing dynamically configurable high-speed network services for a network of computing devices. Organizations often use multiple computing devices. These computing devices may communicate with each other over a network, such as a local area network or the Internet.

In such networks, it may be desirable to provide various types of network services. Examples of such network services include, among others, firewalls, load balancers, storage accelerators, and encryption services. These services may help ensure the integrity of data provided over the network, optimize connection speeds and resource utilization, and generally make the network more reliable and secure. For example, a firewall typically creates a logical barrier to prevent unauthorized traffic from entering or leaving the network, and an encryption service may protect private data from unauthorized recipients. A load balancer may distribute a workload across multiple redundant computers in the network, and a storage accelerator may increase the efficiency of data retrieval and storage.

These network services can be complicated to implement, particularly in networks that handle a large amount of network traffic. Often such networks rely on special-purpose hardware appliances to provide network services. However, special-purpose hardware appliances can be quite expensive. Moreover, special-purpose hardware appliances may be difficult to maintain, and be inflexible with regard to the typical ebb and flow of demand for specific network services. Thus, there may be a need in the art for novel system architectures to address one or more of these issues.

SUMMARY

Methods, systems, and devices are described for implementing and managing virtual network services using a self-contained network services system. The self-contained network services system may include a number of network services modules for providing one or more network services. Each network service module may be implemented by at least one server, server blade, or other dynamically configurable computing devices executing instances of network service applications to provide a dynamically configurable set of network services.

In a first set of illustrative embodiments, method of managing network services may include: providing network services to a client network comprising a first network fabric at a self-contained network services system implementing a number of redundant instances of a network service application, the self-contained network services system having a second network fabric; and adapting the second network fabric to distribute network service tasks received from the client network which are associated with the network service application among the redundant instances of the network service application.

In a second set of illustrative embodiments, a self-contained network services system may include multiple network service modules configured to implement a number of redundant instances of a network service application associated with providing network services to a client network having a first network fabric. The network service modules may be communicatively coupled with each other through a second network fabric. At least one of the network service modules may include a network service task distribution module operative to adapt the second network fabric to distribute network service tasks received from the client network which are associated with the network service application among the redundant instances of the network service application.

In a third set of example embodiments, a computer program product for managing network socket services may include a tangible computer readable storage device having a plurality of computer readable instructions stored thereon. The computer-readable instructions may include: computer-readable instructions configured to cause at least one processor to provide network services to a client network having a first network fabric at a self-contained network services system implementing a number of redundant instances of a network service application, the self-contained network services system having a second network fabric; and computer-readable instructions configured to cause the at least one processor to adapt the second network fabric to distribute network service tasks received from the client network which are associated with the network service application among the redundant instances of the network service application.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
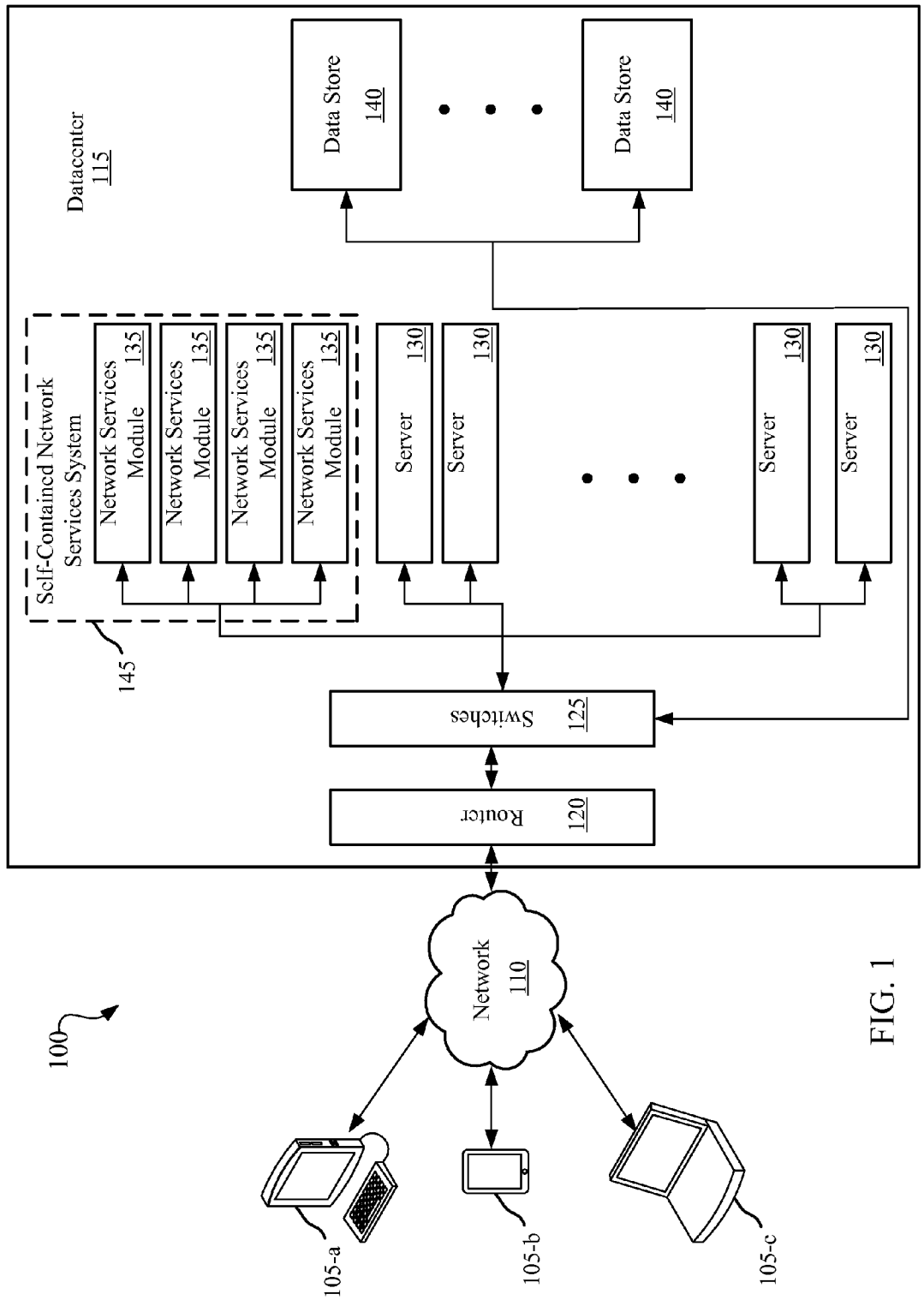
FIG. 1 is a block diagram of an example system including components configured according to various embodiments of the invention.

Methods, systems, and devices are described for implementing virtual network services using a self-contained network services system. The self-contained network services system may include a number of servers, server blades, or other dynamically configurable computing devices which execute a number of instances of network service applications to provide a dynamically configurable set of network services. Each server or other computer device contained within the self-contained network services system shall be referred to as a network services module, and may provide one or more network services. At least one network services module in the self-contained network services system may be configured to execute a controller application that manages the software configuration of other network services modules.

The controller application may receive requests for changes in network services, determine new software configurations for one or more of the network service modules based on the received request, and dynamically configure the network service modules according to the new software configuration, and reconfigure the network and a router associated with the network services system to distribute traffic among the network service modules in accordance with the requested change in network services.

The network service application instances may exchange state information through mutual access to a shared database. Faulty network service application instances may be isolated and restarted or replaced based on the state information in the shared database. A router or other forwarding device in the self-contained network services system may distribute tasks among network service application instances allocated to various network services modules. Where redundant instances of the same network service application are running, the router or other forwarding device may distribute network traffic associated with the network service application among the redundant instances. Servers may use a number of discovery mechanisms, including new or repurposed routing protocols, to identify and join existing self-contained network services systems in the network and become a network services module.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

As used in the present specification and in the appended claims, the term "network socket" or "socket" refers to an endpoint of an inter-process communication flow across a computer network. Network sockets may rely on a transport-layer protocol (e.g., Transmission Control Protocol (TCP), User Datagram Protocol (UDP), etc.) to transport packets of a network layer protocol (e.g., Internet Protocol (IP), etc.) between two applications.

Systems, devices, methods, and software are described for providing dynamically configurable network services at high-speeds using commodity hardware. In one set of embodiments, shown in FIG. 1, a system 100 includes client devices 105 (e.g., desktop computer 105-*a*, mobile device 105-*b*, portable computer 105-*c*, or other computing devices), a network 110, and a datacenter 115. Each of these components may be in communication with each other, directly or indirectly.

The datacenter 115 may include a router 120, one or more switches 125, a number of servers 130, and a number of data stores 140. For the purposes of the present disclosure, the term "server" may be used to refer to hardware servers and virtual servers. Additionally, the term "switch" may be used to refer to hardware switches, virtual switches implemented by software, and virtual switches implemented at the network interface level. In certain examples, the data stores 140 may include arrays of machine-readable physical data storage. For example, data stores 140 may include one or more arrays of magnetic or solid-state hard drives, such as one or more Redundant Array of Independent Disk (RAID) arrays.

The datacenter 115 may be configured to receive and respond to requests from the client devices 105 over the network 110. The network 110 may include a Wide Area Network (WAN), such as the Internet, a Local Area Network (LAN), or any combination of WANs and LANs. Each request from a client device 105 for data from the datacenter 115 may be transmitted as one or more packets directed to a network address (e.g., an Internet Protocol (IP) address) associated with the datacenter 115. Using the network address, the request may be routed over the network 110 to the datacenter 115, where the request may be received by router 120.

Each request received by router 120 may be directed over the switches 125 to one of the servers 130 in the server bank for processing. Processing the request may include interpreting and servicing the request. For example, if the request from the client device 105 is for certain data stored in the data stores 140, interpreting the request may include one of the servers 130 identifying the data requested by the client device 105, and servicing the request may include the server 130 formulating an instruction for retrieving the requested data from the data stores 140.

This instruction may be directed over one or more of the switches 125 to a data store 140, which may retrieve the requested data. In certain examples, the request may be routed to a specific data store 140 based on the data requested. Additionally or alternatively, the data stores 140 may store data redundantly, and the request may be routed to a specific data store 140 based on a load balancing or other functionality.

Once the data store 140 retrieves the requested data, the switches 125 may direct the requested data retrieved by the data store 140 back to one of the servers 130, which may assemble the requested data into one or more packets addressed to the requesting client device 105. The packet(s) may then be directed over the first set of switches 125 to router 120, which transmits the packet(s) to the requesting client device 105 over the network 110.

In certain examples, the datacenter 115 may implement the back end of a web site. In these examples, the data stores 140 may store Hypertext Transfer Markup Language (HTML) documents related to various component web pages of the web site, in addition to data (e.g., images, metadata, media files, style sheets, plug-in data, and the like) embedded in or otherwise associated with the web pages. When a user of one of the client devices 105 attempts to visit a web page of the website, the client device 105 may contact a Domain Name Server (DNS) to look up the IP address associated with a domain name of the website. The IP address may be the IP address of the datacenter 115. The client device 105 may then transmit a request for the web page to the datacenter 115 and receive the web page in the aforementioned manner.

Datacenters 115 and other network systems may be equipped to handle large quantities of network traffic. To effectively service this traffic, it may be desirable to provide certain network services, such as firewall services, security services, load balancing services, and storage accelerator services. Firewall services provide logical barriers to certain types of unauthorized network traffic according to a set of rules. Security services may implement encryption, decryption, signature, and/or certificate functions to prevent unauthorized entities from viewing network traffic. Load balancing services may distribute incoming network traffic among the servers 130 to maximize the productivity and efficiency. Storage accelerator services distribute requests for data among data stores 140 and cache recently or frequently requested data for prompt retrieval.

In some datacenters, these network services may be provided using special purpose hardware appliances. For example, in some datacenters similar in scope to datacenter 115, a special-purpose firewall appliance and a special-purpose security appliance may be placed in-line between the router and the first set of switches. Additionally, a special-purpose load balancing appliance may be placed between the first set of switches and the servers, and a special-purpose storage accelerator appliance may be placed between the second set of switches and the data stores.

However, the use of special-purpose hardware appliances for network services may be undesirable for a number of reasons. Some special-purpose hardware appliances may be expensive, and can costing orders of magnitude more than commodity servers. Special purpose hardware appliances may also be difficult to manage, and may be unable to dynamically adapt to changing network environments. Moreover, special-purpose hardware appliances often may be unable to leverage the continuously emerging optimizations for commodity server architectures.

The datacenter 115 of FIG. 1 may avoid one or more of the aforementioned disadvantages associated with special-purpose hardware appliances through the use of a block of commodity or general-purpose servers 130 that can be programmed to act as dynamically configurable network services modules 135. The network services modules 135 collectively function as a self-contained network services system 145 by executing special-purpose software installed on the servers 130 in the dedicated block. For purposes of the present disclosure, the term "self-contained" refers to the autonomy of the network services system 145 implemented by the network services modules 135. Each of the network services modules 135 in the self-contained network services system 145 may be programmed with special-purpose network services code which, when executed by the network services modules 135, causes the network services modules 135 to implement network services. It should be understood that the servers 130 implementing the network services modules 135 in the self-contained network services system 145 are not limited to network services functionality. Rather, the servers 130 implementing the network services modules 135 in the network services system 145 may also execute other applications that are not directly related to the self-contained network services system 145.

Use of commodity servers 130 in the datacenter 115 may allow for elastic scalability of network services. Network services may be dynamically added, removed, or modified in the datacenter 115 by reprogramming one or more of the network services modules 135 in the self-contained network services system 145 with different configurations of special-purpose code according to the changing needs of the datacenter 115.

Furthermore, because the network services are provided by programming commodity servers with special-purpose code, some of the servers 130 in the server bank of the datacenter 115 may be allocated to the self-contained network services system 145 and configured to function as virtual network services modules 135. Thus, in certain examples, the number of servers 130 allocated to the self-contained network services system 145 may grow as the datacenter 115 experiences increased demand for network services. Conversely, as demand for network services wanes, the number of servers 130 allocated to the self-contained network services system 145 may shrink to more efficiently use the processing resources of the datacenter 115.

The self-contained network services system 145 may be dynamically configurable. In some embodiments, the type and scope of network services provided by the network services system 145 may be modified on-demand by a datacenter administrator or other authorized individual. This reconfiguration may be accomplished by interacting with a network services controller application using a Graphical User Interface (GUI) or Command Line Interface (CLI) over the network (110) or by logging into one of the network services modules 135 locally.

The configuration of the network services system 145 may be quite adaptable. As described above, network services applications may be dynamically loaded and removed from individual network services modules 135 to add or remove different types of network services functionality. Beyond the selection of which network services applications to execute, other aspects of the network services system 145 operations may be customized to suit a particular set of network services needs.

One such customizable aspect is the computing environment (e.g., dedicated hardware, virtual machine within a hypervisor, virtual machine within an operating system) in which a particular network services application is executed. Other customizable aspects of the network services system 145 may include the number of network services applications executed by each instance of an operating system, the number of virtual machines (if any) implemented by the network services modules 135, the total number of instances of each network services application to be executed concurrently, and the like. In certain examples, one or more of these aspects may be statically defined for the network services system 145. Additionally or alternatively, one or more of these aspects may be dynamically adjusted (e.g., using a rules engine and/or in response to dynamic input from an administrator) in real-time to adapt to changing demand for network services.

Each of the servers 130 implementing a network services module 135 may function as a virtual network appliance in the self-contained network services system 145 and interact with other components of the datacenter 115 over the one or more switches 125. For example, one or more network services modules 135 may function as a firewall by receiving all packets arriving at the router 120 over the one or more switches 125, applying one or more packet filtering rules to the incoming packets, and directing approved packets to a handling server 130 over the one or more switches 125. Similarly, one or more network services modules 135 may function as a storage accelerator by receiving data storage commands over the one or more switches 125.

Thus, because the network services can be performed directly from the server bank through the use of switches 125 there is no need to physically reconfigure the datacenter 115 when network services are added, modified, or removed.

Figure 2A:
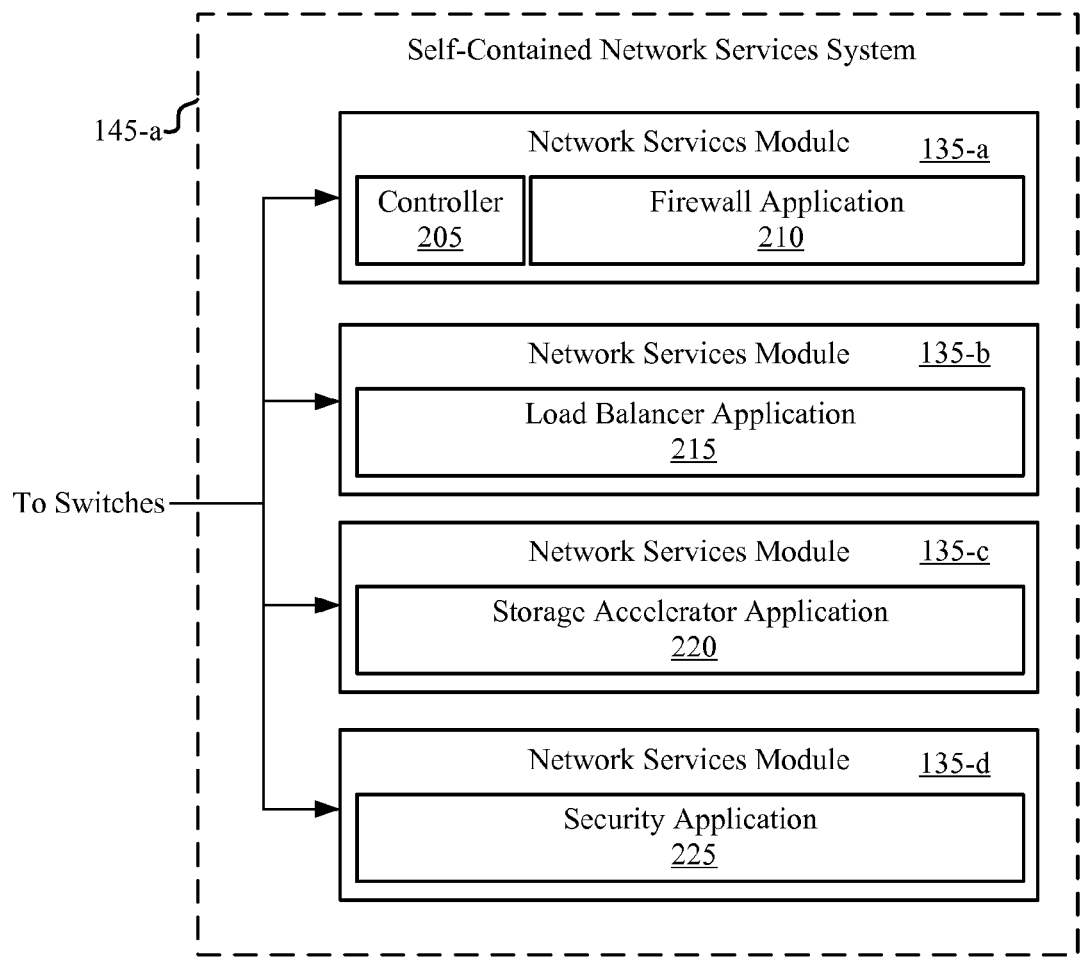
FIG. 2A and FIG. 2B are block diagrams of examples of a self-contained network services system configured according to various embodiments of the invention.
Figure 2B:
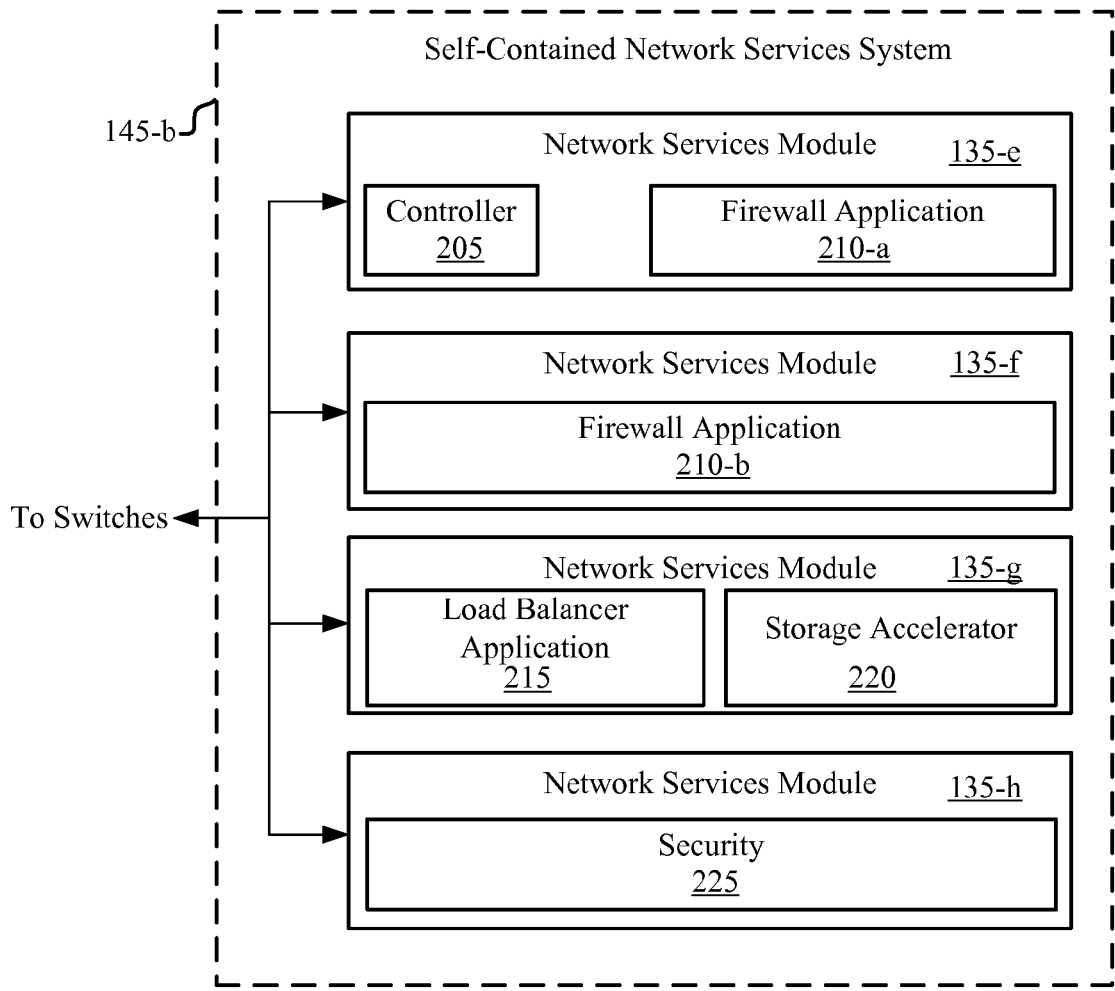

FIGS. 2A and 2B show two separate examples of configurations of network services modules 135 as network services appliances in self-contained network services systems 145 (e.g., the self-contained network services system 145 of FIG. 1).

FIG. 2A shows a self-contained network services system 145-a that includes four commodity servers which are specially programmed to function as network services modules 135. The self-contained network services system 145-a and network services modules 135 may be examples of the self-contained network services system 145 and network services modules 135 described above with reference to FIG. 1.

The network services implemented by each network services module 135 are determined by special-purpose applications executed by the network services modules 135. In the present example, network services module 135-a has been programmed to execute a firewall application 210 to implement a firewall appliance. Network services module 135-b has been programmed to execute a load balancing application 215 to implement a load balancer appliance. Network services module 135-c has been programmed to execute a storage accelerator application 220 to implement a storage accelerator appliance. Network services module 135-d has been programmed to execute a security application 225 to implement a security appliance. It should be recognized that in certain examples, multiple instances of the same network services application may be executed by the same or different network services modules 135 to increase efficiency, capacity, and service resilience.

Additionally, network services module 135-a executes a network services controller application 205. The network services controller application 205 may, for example, coordinate the execution of the network services applications by the network services modules 135. For example, the network services controller application 205 may communicate with an outside administrator to determine a set of network services to be implemented and allocate network services module 135 resources to the various network services applications to provide the specified set of network services. In certain examples, the functionality of the network services controller application 205 may be distributed among multiple network services modules 135. In other examples, at least one of the network services applications 205, 210, 215, 220, 225 may be performed by special-purpose hardware or by a combination of one or more network services modules 135 and special-purpose hardware. Thus, the self-contained network services system 145-b may supplement or replace special-purpose hardware in performing network services.

FIG. 2B shows an alternate configuration of network services modules 135-e to 135-h in a self-contained network services system 145-b of a datacenter (e.g., datacenter 115 of FIG. 1). The self-contained network services system 145-b and network services modules 135-a to 135-d may be examples of the self-contained network services system 145-a and network services modules 135 described above with reference to FIG. 1 or 2A. In contrast to the configuration of FIG. 2A, the configuration of FIG. 2B allocates two network services modules 135-e, 135-f to executing firewall applications 210 for the provision of firewall services. Additionally, the present example divides the resources of network services module 135-g between the load balancing application and the storage acceleration application. In one example, the configuration of the network services modules 135 in a self-contained network services system 145 may be switched from that shown in FIG. 2A to that shown in FIG. 2B in response to an increased demand for firewall services and a decreased demand for load balancing and storage acceleration services.

Figure 3A:
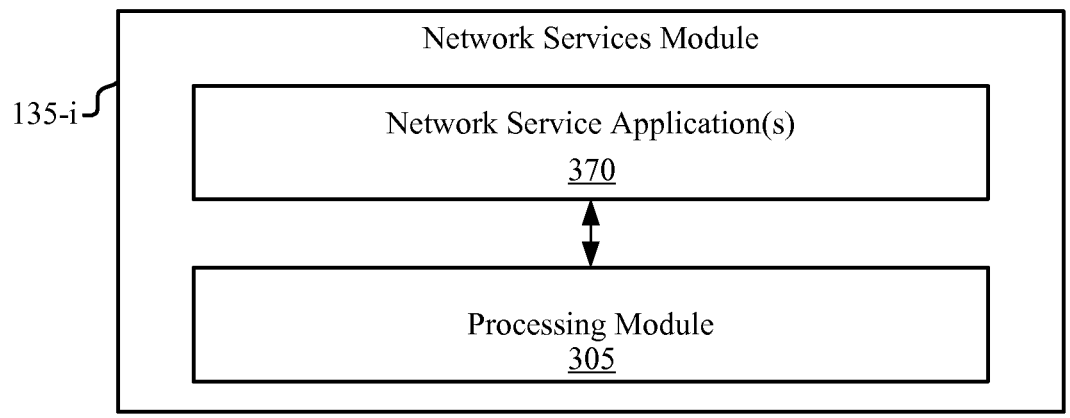
FIG. 3A and FIG. 3B are block diagrams of examples of a network services module including components configured according to various embodiments of the invention.

FIG. 3A is a block diagram of one example of a network services module 135-i that may be included in a datacenter (e.g., datacenter 115 of FIG. 1) and dynamically allocated to a self-contained network services system 145 to perform network services for the datacenter. The network services module 135-i may be an example of the network services modules 135 described above with respect to FIG. 1, 2A, or 2B. The network services module 135-i of the present example includes a processing module 305 and one or more network service applications 370. Each of these components may be in communication, directly or indirectly.

The processing module 305 may be configured to execute code to execute the one or more network service applications 370 (e.g., applications 205, 210, 215, 220, 225 of FIG. 2A or 2B) to implement one or more network services selected for the network services module 135-i. In some examples, the processing module 305 may include one or more computer processing cores that implement an instruction set architecture. Examples of suitable instruction set architectures for the processing module 305 include, but are not limited to, the x86 architecture and its variations, the PowerPC architecture and its variations, the Java Virtual Machine architecture and its variations, and the like.

In certain examples, the processing module 305 may include a dedicated hardware processor. Additionally or alternatively, the processing module 305 may include a virtual machine implemented by a physical machine through a hypervisor or an operating system. In still other examples, the processing module 305 may include dedicated access to shared physical resources and/or dedicated processor threads.

The processing module 305 may be configured to interact with the network service applications 370 to implement one or more network services. The network service applications 370 may include elements of software and/or hardware that enable the processing module 305 to perform the functionality associated with at least one selected network service. In certain examples, the processing module 305 may include an x86 processor and one or more memory modules storing the one or more network service applications 370 executed by the processor to implement the at least one selected network service. In these examples, the network services implemented by the network services module 135-i may be dynamically reconfigured by adding code for one or more additional network service applications 370 to the memory modules, removing code for one or more existing network service applications 370 from the memory modules, and/or replacing the code corresponding to one or more network service applications 370 with code corresponding to one or more different network service applications 370.

In additional or alternate examples, the processing module 305 may include an FPGA and the network service applications 370 may include code that can be executed by the FPGA to configure logic gates within the FPGA, where the configuration of the logic gates determines the type of network service(s), if any, implemented by the FPGA. In these examples, the network services implemented by the network services module 135-j may be dynamically reconfigured by substituting the gate configuration code in the FPGA with new code corresponding to a new network services configuration.

Figure 3B:
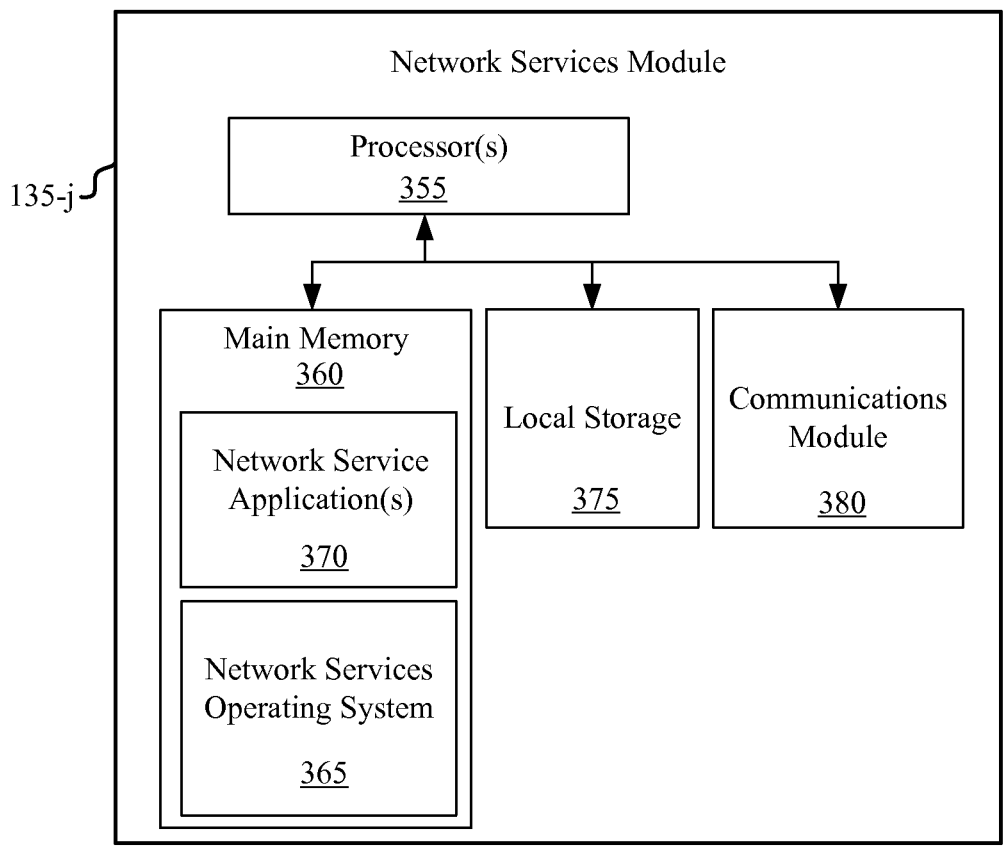

FIG. 3B illustrates a more detailed example of a network services module 135-j that may be used in a self-contained network services system (e.g., the self-contained network system 145 of FIG. 1) consistent with the foregoing principles. The network services module 135-j may be an example of a network services module in a network services system. The network services module 135-j of the present example includes a processor 355, a main memory 360, local storage 375, and a communications module 380. Each of these components may be in communication, directly or indirectly.

The processor 355 may include a dedicated hardware processor, a virtual machine executed by a hypervisor, a virtual machine executed within an operating system environment, and/or shared access to one or more hardware processors. In certain examples, the processor 355 may include multiple processing cores. The processor 355 may be configured to execute machine-readable code that includes a series of instructions to perform certain tasks. The machine-readable code may be modularized into different programs. In the present example, these programs include a network services operating system 365 and a set of one or more network service applications 370.

The operating system 365 may coordinate access to and communication between the physical resources of the network services module 135-j, including the processor 355, the main memory 360, the local storage 375, and the communications module 380. For example, the operating system 365 may manage the execution of the one or more network service application(s) 370 by the processor 355. This management may include assigning space in main memory 360 to the application 370, loading the code for the network service applications 370 into the main memory 360, determining when the code for the network service applications 370 is executed by the processor 355, and controlling access by the network service applications 370 to other hardware resources, such as the local storage 375 and communications module 380.

The operating system 365 may further coordinate communications for applications 370 executed by the processor 355. For example, the operating system 365 may implement internal application-layer communications, such as communication between two network service applications 370 executed in the same environment, and external application-layer communications, such as communication between a network service applications 370 executed within the operating system 365 and a network service applications 370 executed in a different environment using network protocols.

As described in more detail below, in certain examples the operating system 365 may be a custom operating system with optimizations and features that allow the processor 355 to perform network processing services at speeds matching or exceeding that of special-purpose hardware appliances designed to provide equivalent network services.

Each network service application 370 executed from main memory 360 by the processor may cause the processor 355 to implement a specific type of network service functionality. As described above, network service applications 370 may exist to implement firewall functionality, load balancing functionality, storage acceleration functionality, security functionality, and/or any other network service that may suit a particular application of the principles of this disclosure.

Thus, the network services module 135-j may dynamically add certain elements of network service functionality by selectively loading one or more new network service applications 370 into the main memory 360 for execution by the processor 355. Similarly, the network services module 135-j may be configured to dynamically remove certain elements of network services functionality by selectively terminating the execution of one or more network service applications 370 in the main memory 360.

The local storage 375 of the network services module 135-*j* may include one or more real or virtual storage devices specifically associated with the processor 355. In certain examples, the local storage 375 of the network services module may include one or more physical media (e.g., magnetic disks, optical disks, solid-state drives, etc.). In certain examples, the local storage 375 may store the executable code for the network services operating system 365 and network service applications 370 such that when the network services module 135-*j* is booted up, the code for the network services operating system 365 is loaded from the local storage 375 into the main memory 360 for execution. When a certain type of network service is desired, the network service application(s) 370 corresponding to the desired network service may be loaded from the local storage 375 into the main memory 360 for execution. In certain examples, the local storage 375 may include a repository of available network service applications 370, and the network service functionality implemented by the network services module 135-*j* may be dynamically altered in real time by selectively loading or removing network service applications 370 into or from the main memory 360.

The communications module 380 of the network services module 135-*j* may include logic and hardware components for managing network communications with client devices, other network services modules 135, and other network components. In certain examples, the network services module 135-*j* may receive network data over the communications module 380, process the network data with the network service applications 370 and the network services operating system 365, and return the results of the processed network data to a network destination over the communications module. Additionally, the communications module 380 may receive instructions over the network for dynamically reconfiguring the network services functionality of the network services module 135-*j*. For example, the communications module 380 may receive an instruction to load a first network service application 370 into the main memory 360 for execution and/or to remove a different network service application 370 from the main memory 360.

Figure 4:
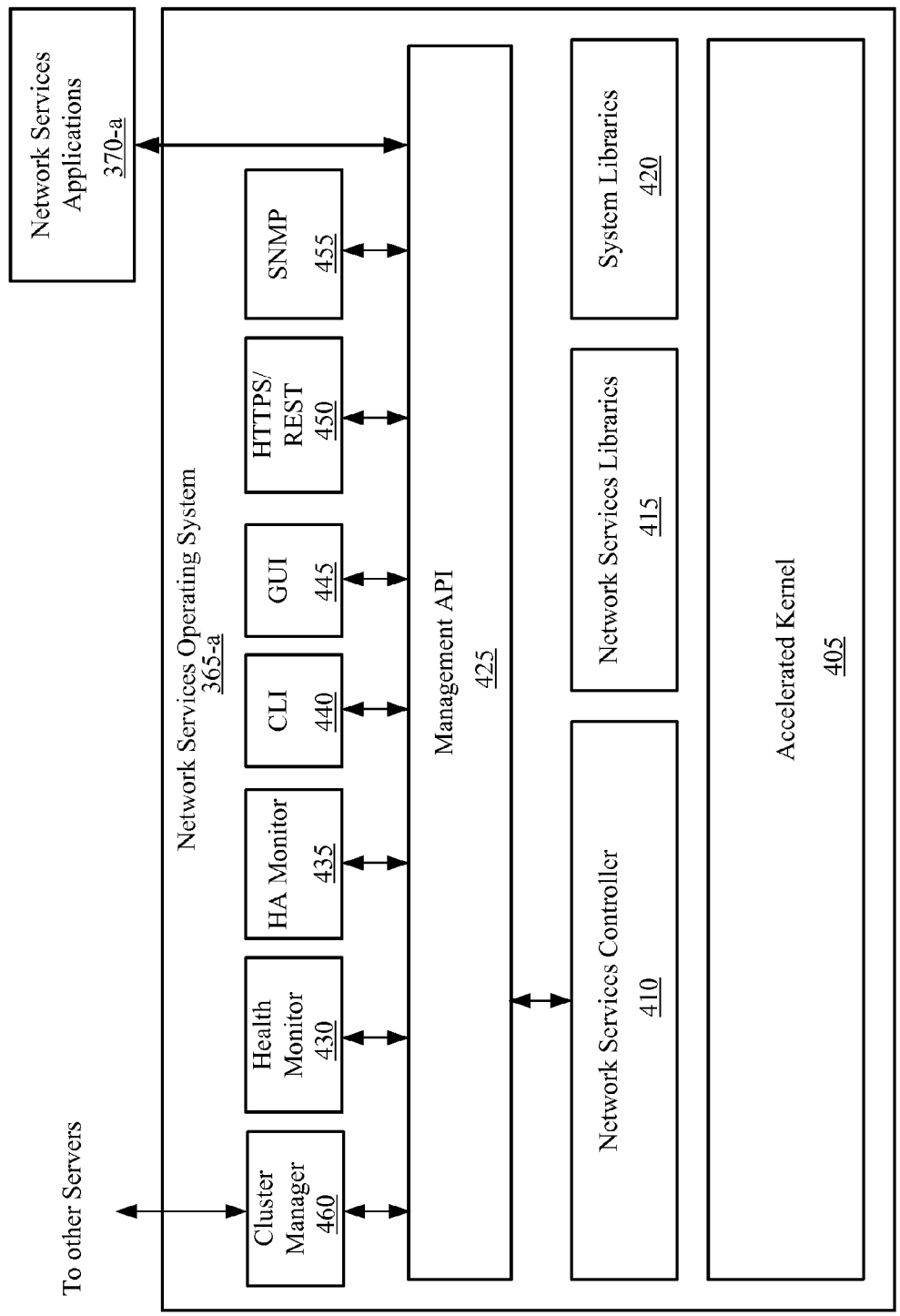
FIG. 4 is a block diagram of an example of a network services operating system architecture according to various embodiments of the invention.

As described above, each network services module 135 in a self-contained network services system 145 may be configured to execute one or more instances of a custom operating system with optimizations and features that allow the processor 355 to perform network processing services at speeds matching or exceeding that of special-purpose hardware appliances designed to provide equivalent network services. FIG. 4 illustrates an example architecture for one such operating system 365-*a*. The operating system 365-*a* may be an example of the operating system 365 described above with reference to FIG. 3B. Additionally, the operating system 365-*a* may be a component of the processing module 305 and/or the configurable network services module 370 described above with reference to FIG. 3A.

The operating system 365-*a* of the present example includes an accelerated kernel 405, a network services controller 410, network services libraries 415, system libraries 420, a management Application Programming Interface (API) 425, a health monitor 430, a High Availability (HA) monitor 435, a command line interface (CLI) 440, a graphical user interface (GUI) 445, a Hypertext Transfer Protocol Secure (HTTP)/REST interface 450, and a Simple Network Management Protocol (SNMP) interface 455. Each of these components may be in communication, directly or indirectly.

The operating system 365-*a* may be configured to manage the execution of one or more network services applications 370-*a*. The one or more network services applications 370-*a* may be an example of the network services applications 370 described above with respect to FIG. 3. As described above, the network services applications 370-*a* may run within an environment provided by the network services operating system 365-*a* to implement various network services (e.g., firewall services, load balancing services, storage accelerator services, security services, etc.). Additionally, the operating system 365-*a* may be in communication with one or more third party management applications 460 and/or a number of other servers and network services modules.

The accelerated kernel 405 may support the inter-process communication and system calls of a traditional Unix, Unix-like (e.g., Linux, OS/X), Windows, or other operating system kernel. However, the accelerated kernel 405 may include additional functionality and implementation differences over traditional operating system kernels. For example, the additional functionality and implementation differences may substantially increase the speed and efficiency of access to the network stack, thereby making the performance of real-time network services possible within the operating system 365-*a* without imposing delays on network traffic. Examples of such kernel optimizations are given in more detail below.

The accelerated kernel 405 may dynamically manage network stack resources in the accelerated kernel 405 to ensure efficient and fast access to network data during the performance of network services. For example, the accelerated kernel 405 may optimize parallel processing of network flows by performing load balancing operations across network stack resources. In certain embodiments, the accelerated kernel 405 may dynamically increase or decrease the number of application layer threads or driver/network layer threads accessing the network stack to balance work loads and optimize throughput by minimizing blocking conditions.

The network services controller 410 may implement a database that stores configuration data for the accelerated kernel 405 and other modules in the network services operating system 365-*a*. The network services controller 410 may allow atomic transactions for data updates, and notify listeners of changes. Using this capability, modules (e.g., the health monitor 430, the HA monitor 435) of the network services operating system 365-*a* may effect configuration changes in the network services operating system 365-*a* by updating configuration data in the network services controller 410 and allowing the network services controller 410 to notify other modules within the network services operating system 365-*a* of the updated configuration data.

The management API may communicate with the network services controller 410 and provide access to the network services controller 410 for the health monitor 430, the HA monitor 435, the command line interface 440, the graphical user interface 445, the HTTPS/REST interface 450, and the SNMP interface 455.

The health monitor 430 and the high availability monitor 435 may monitor conditions in the network services operating system 365-*a* and update the configuration data stored at the network services controller 410 and to tune network stack access and/or other aspects of the accelerated kernel 405 to best adapt to a current state of the operating system 365-*a*. For example, the health monitor 430 may monitor the overall health of the operating system 365-*a*, detect problematic conditions that may introduce delay into network stack access, and respond to such conditions by returning the balance of application layer threads and driver layer threads that access the network stack to achieve a more optimal throughput.

The high availability monitor 435 may dynamically update the configuration data of the network services controller 410 to assign one or more servers implemented by the network services operating system 365-*a* to respond to traffic for a given IP address.

In additional or alternative examples, the management API 425 may also receive instructions to dynamically load or remove one or more network services applications 370-*a* on the host network services module 135 and/or to make configuration changes to network services operating system 365-*a*.

The management API 425 may communicate with an administrator or managing process by way of the command line interface 440, the graphical user interface 445, the HTTPS/REST interface 450, or the SNMP interface 455. Additionally, the network services operating system 365-*a* may support one or more third-party management applications that communicate with the management API 425 to dynamically load, remove, or configure the network applications managed by the network services operating system 365-*a*. In certain examples, the network services operating system 365-*a* may also implement a cluster manager 460. The cluster manager 460 may communicate with other network services modules 135 in a self-contained network services module (e.g., the network services system 145 of FIG. 1, 2A, or 2B) to coordinate the distribution of network services among the network services modules 135.

By way of the cluster manager 460, the network services operating system 365-*a* may receive an assignment of certain network services applications 370-*a* to execute. Additionally or alternatively, the cluster manager 460 may assign other network services modules 135 in the network services system to execute certain network services applications 370-*a* based on input received over the command line interface 440, the graphical user interface 445, the HTTPS/REST interface 450, the SNMP interface 455, and/or the third party management application(s). By implementing communication with other network services modules 135 in a cluster, the cluster manager 460 enables dynamic horizontal scalability in the delivery of network services.

The network services operating system 365-*a* may also implement various software libraries 415, 420 for use by applications executed within the environment provided by the network services operating system. These libraries may include network services libraries 415 and ordinary system libraries 420. The network services libraries 415 may include libraries that are specially developed for use by the network services applications 370-*a*. For example, the network services libraries 415 may include software routines or data structures that are common to different types of network services applications 370-*a*.

The system libraries 420 may include various libraries specific to a particular operating system class implemented by the network services operating system 365-*a*. For example, the network services operating system 365-*a* may implement a particular Unix-like interface, such as FreeBSD. In this example, the system libraries 420 of the network services operating system 365-*a* may include the system libraries associated with FreeBSD. In certain examples, the system libraries 420 may include additional modifications or optimizations for use in the provision of network services. By implementing these system libraries 420, the operating system 365-*a* may be capable of executing various unmodified third-party applications (e.g., third party management application(s) 460). These third-party applications may, but need not, be related to the provision of network services.

Figure 5:
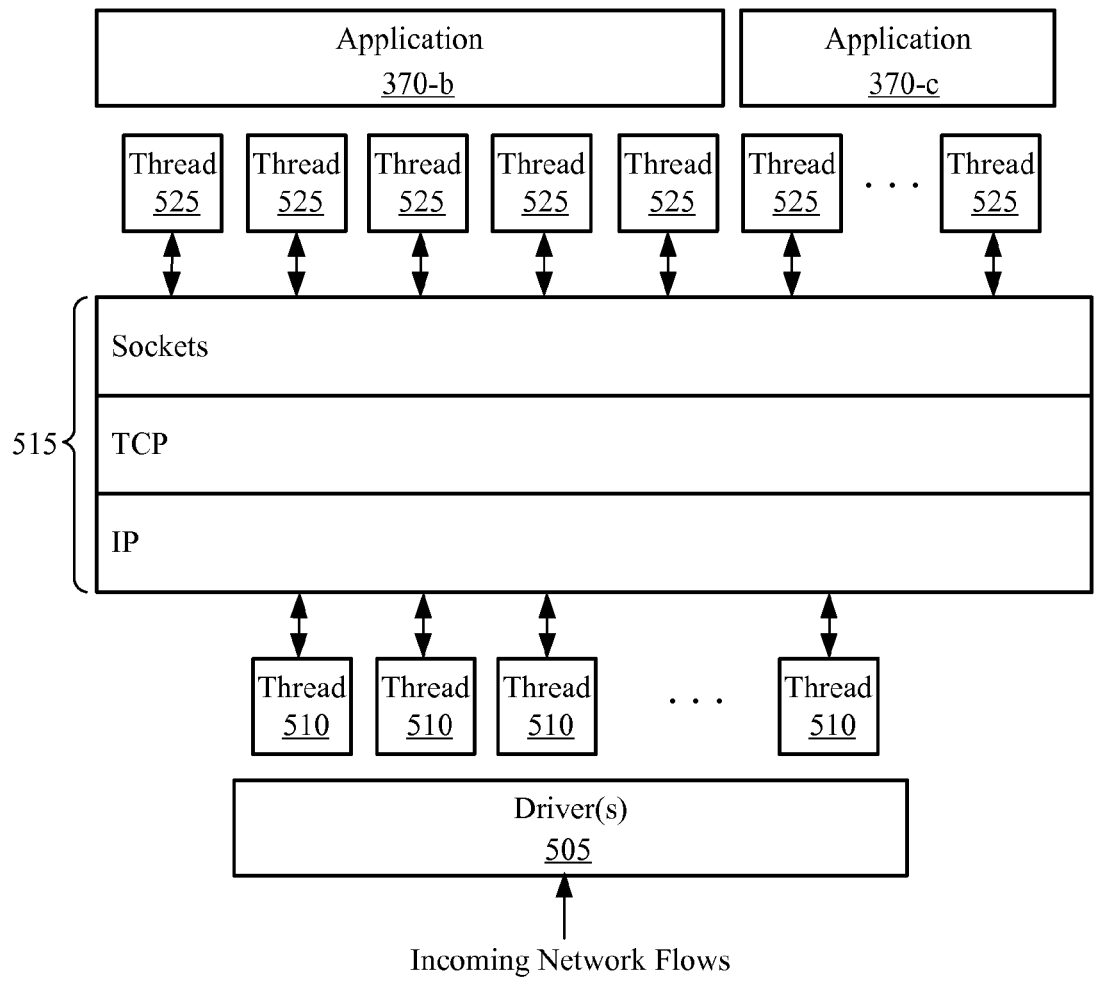
FIG. 5 is a block diagram of an example of a balanced network stack access scheme in a network services operating system according to various embodiments of the invention.

FIG. 5 illustrates a block diagram of one example of network stack management within a network services operating system. For example, the network stack management shown in FIG. 5 may be performed by the accelerated kernel 405 and network services controller 410 of the network systems operating system 365-*a* of FIG. 3.

In the present example, a network stack 515 includes data related to network communications made at the Internet Protocol (IP) level, data related to network communications made at the Transmission Control Protocol (TCP) level (e.g., TCP state information), and data related to TCP sockets. Incoming network flows that arrive at one or more input threads 510 network ports may be added to the network stack 515 and dynamically mapped to one or more application threads 525. The application threads 525 may be mapped to one or more stages of running applications 370. The mapping of incoming network flows to application threads 525 may be done in a way that balances the work load among the various application threads 525. For example, if one of the application threads 525 becomes overloaded, new incoming network flows may not be mapped to that application thread 525 until the load on that application thread is reduced.

For example, consider the case where the operating system executes network services applications 370 for a web site and a command is received (e.g., at management API 425 of FIG. 4) to enable Hypertext Transfer Protocol Secure (HTTPS) functionality. To do so, the operating system may instruct the network services security application 370 to load a cryptographic library with which to encrypt and decrypt data carried in incoming and outgoing network packets. In light of the CPU-intensive nature of cryptographic operations the number of application threads 525 may be dynamically increased and the number of incoming threads 505 may be correspondingly decreased. By shifting more processing resources to the network services security application, the potential backlog in HTTPS packet processing may be averted or reduced, thus optimizing throughput.

Additionally, the network stack 515 of the present example may be configured to allow for concurrent access by multiple processor threads 510. In previous solutions, each time a thread accesses a network resource (e.g., TCP state information in the network stack 515), other threads are locked out of accessing that collection of network resource (typically the entire set). As the number of network connections increases, contention for the shared network resource may increase resulting in head of line blocking and thereby effectively serializing network connection processes that are intended to occur in parallel. By including the use of a large hash table with fine-grained locking, the probability of contention for shared network resources approaches zero. Further, by dynamically balancing the processing load between application threads 525, the operating system of the present example may evenly distribute the demand for network stack resources across the total number of threads 510, thereby improving data flow These types of optimizations to the network stack 515 of the present example may be implemented without altering the socket interfaces of the operating system. Thus, where the network operating system is running on a standard general-purpose processor architecture (e.g., the x86 architecture), any network application designed for that architecture may receive the benefits of increased throughput and resource efficiency in this environment without need of altering the network application.

Figure 6A:
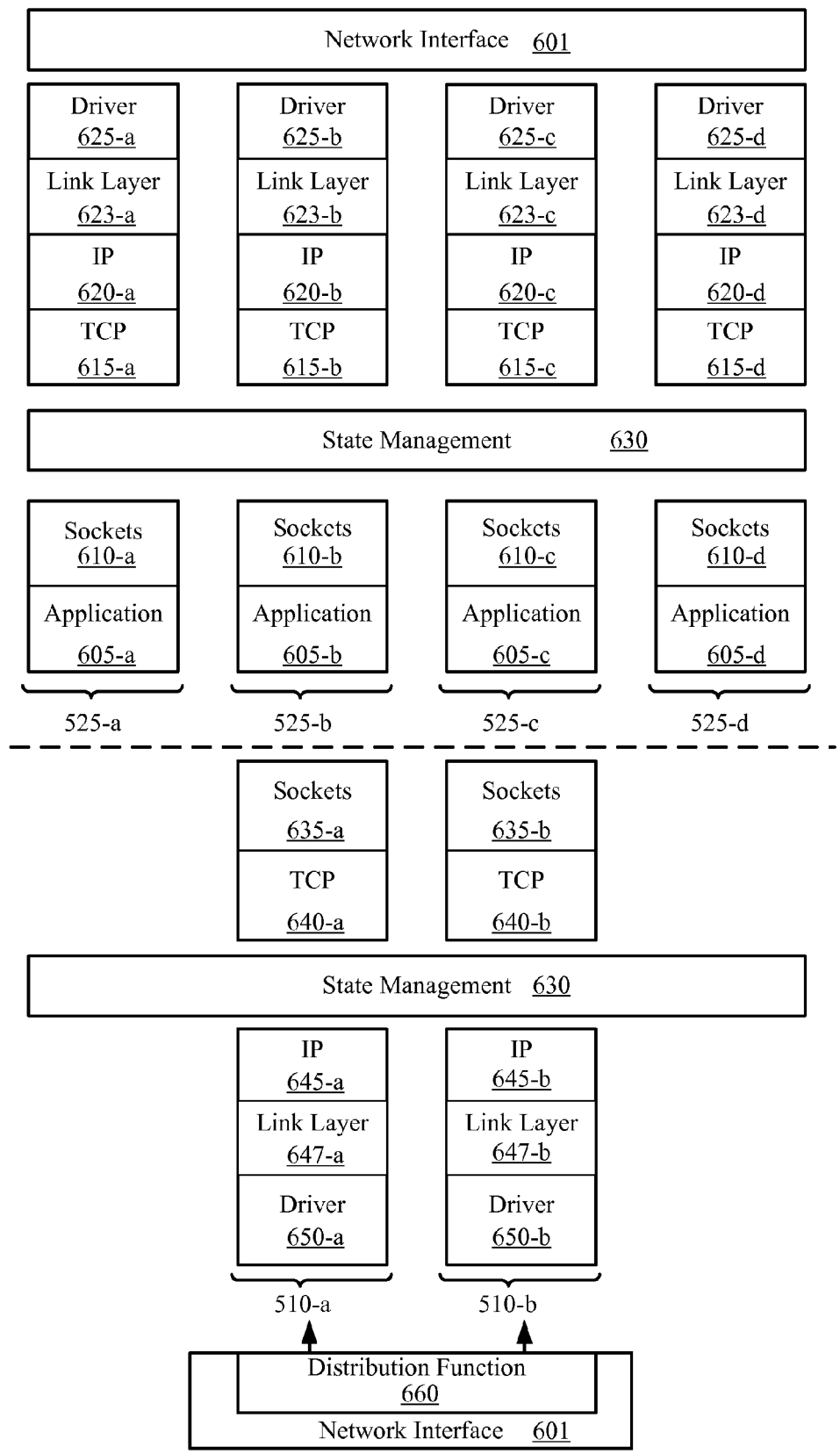
FIG. 6A is a block diagram of an example of a balanced thread distribution scheme in a network services operating system according to various embodiments of the invention.

FIG. 6A illustrates another example of balanced load optimizations for processing network packets that may occur in an accelerated kernel of a network services operating system (e.g., the operating system 365 of FIG. 3 or 4). In the present example, a number of application threads 525 are shown. Each application thread 525 may be associated with one or more application stages 605. The application stages may be associated with the network services applications 205, 210, 215, 220, 225, 370 described above with respect to the previous Figures. Each of the application threads 525 may be configured to output network packets by performing outgoing socket processing 610, outgoing TCP level processing 615, outgoing IP level processing 620, outgoing link layer processing 623, and outgoing driver level processing 625. As part of this processing, the application threads 525 may access one or more state management tables 630 in parallel.

As further shown in FIG. 6A, input processing may be decoupled from output processing such that only network threads 510 receive and process packets received from the network. Thus, network threads 510-a and 510-b may be currently configured to perform incoming driver level processing 650, incoming link layer processing 647, incoming IP level processing 645, incoming TCP level processing 640, and incoming socket processing 635. Additionally, network threads 510-a and 510-b may be configured to access one or more state management tables 630 in parallel. In certain examples, the use of a large hash table in connection with fine-grained locking may enable fast concurrent access to the state management tables 630 with minimal lockout issues.

In one example, application threads 525 may all equally process and handle new incoming network flows. By contrast, in another example, application threads 525-a and 525-d may become overloaded (e.g. number of connections to service) with respect to threads 525-b and 525-c. In this situation threads 525-a and 525-d may independently or by instruction by a component of the network service operating system (365-a FIG. 4) to temporarily reduce the rate at which they process and handle new incoming network flows until their load is balanced with respect to threads 525-b and 525-c. This re-configuration of the application threads 525 may dynamically occur, for example, in response to the application stages associated with application threads 525-a and 525-d receiving a stream of high-work packets (e.g., multiple HTTPS terminations). By diverting additional incoming packets to peer applications threads 525-b and 525-c, the overall processing load may be balanced among the application threads 525. However, once the workload associated with application threads 525-a and 525-d is reduced, the system may be dynamically updated such that incoming network flows are again distributed to application threads 525-a and 525-d for processing.

In additional or alternative examples, it may be desirable to increase or decrease the number of application threads 525. Such an increase or decrease may occur dynamically in response to changing demand for network services. For example, an application thread 525 may be added by allocating processing resources to the new application thread 525, associating the new application thread 525 with an appropriate application stage 605, and updating the distribution function 660 such that incoming network flows are distributed to the new application thread 525. Conversely, an application thread 525 may be dynamically removed to free up processing resources for another process by allowing the application thread 525 to finish any pending processing tasks assigned to the application thread, updating the distribution function 660, and reallocating the resources of the application thread 525 somewhere else. This dynamic increase or decrease of application threads 525 may occur without need of rebooting or terminating network services.

As further shown in FIG. 6A, incoming network flows may be assigned to network threads 510 using a distribution function 660. The distribution function 660 may be, for example, a modularized hashing function. The number of network threads 510 that receive and process incoming network flows may be dynamically altered by, for example, changing a modulus of the distribution function 660.

Figure 6B:
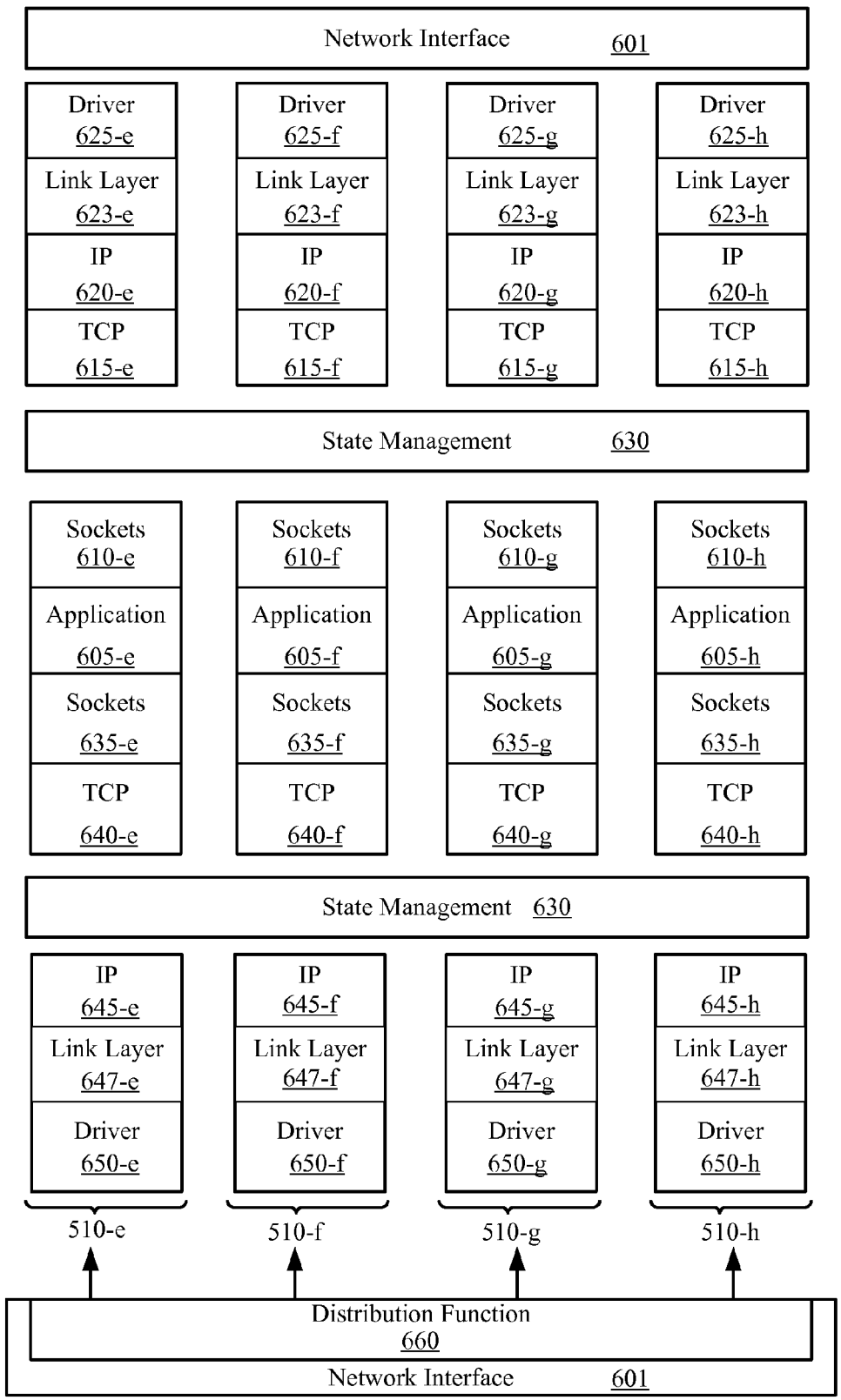
FIG. 6B is a block diagram of an example of a balanced thread distribution scheme in a network services operating system according to various embodiments of the invention.

FIG. 6B illustrates another example of balanced load optimizations for processing network packets that may occur in an accelerated kernel of a network services operating system (e.g., the operating system 365 of FIG. 3 or 4). In the present example, a number of network threads 510 are shown. Each network thread 510 may be associated with both its counterpart's tasks in FIG. 6A as well as the tasks associated with an application thread 525 in FIG. 6. The dynamic re-balancing and re-configuration described above may be similarly accomplished in this configuration by having network threads 510 increase and decrease the rate at which they process and handle new incoming flows.

It is worth noting that while an entire system for providing network services using commodity servers has been described as a whole for the sake of context, the present specification is directed to methods, systems, and apparatus that may be used with, but are not tied to the system of FIGS. 1-6. Individual aspects of the present specification may be broken out and used exclusive of other aspects of the foregoing description. This will be described in more detail, below.

Figure 7:
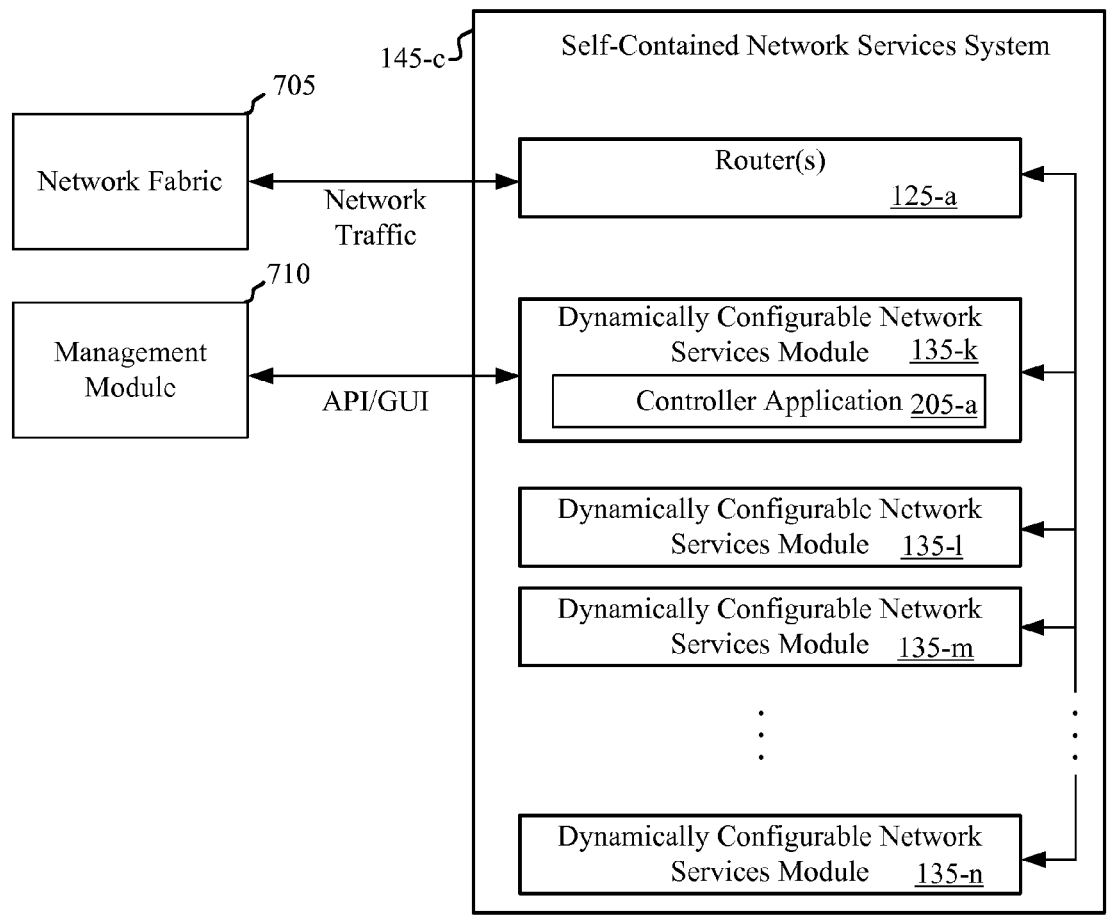
FIG. 7 is a block diagram of an example of a self-contained network services system including components configured according to various embodiments of the invention.

Referring next to FIG. 7, an example of a self-contained network services system 145-c is shown. The self-contained network services system 145-c may be an example of the self-contained network services system 145 described above with reference to one or more of the previous Figures. The self-contained network services system 145-c of the present example may communicate with a network fabric 705 and a management module 710. The network fabric 705 may include physical media, switches, routers, load balancer, and/or other forwarding elements associated with a network serviced by the network services system 145-c. For example, the network fabric 705 may be associated with the network 110, router 120, and switches 125 shown above with reference to FIG. 1. The management module 710 may be implemented by a computer or other device configured to communicate with the self-contained network services system 145-c.

As shown in FIG. 7, the self-contained network services system 145-c of the present example may include at least one router 120-a or other forwarding device, at least one dynamically configurable network services module 135-k configured to execute a controller application 205-a, and a number of additional dynamically configurable network services modules 135-l to 135-n. Each of these components may be in communication, directly or indirectly. The network services module 135-k executing the controller application 205-a and the other dynamically configurable network services modules 135-l to 135-n may be examples of one or more of the network services modules 135 described above with reference to previous Figures.

The router 120-a associated with the self-contained network services system 145-c may be managed and configured separately from routers or switches that are external to the self-contained network services system 145-c. For example, the self-contained network services system 145-c may be deployed to a datacenter or other network environment. While switches and routers in the network fabric 705 external to the self-contained network services system 145-c may be managed and configured according to policies in place for the datacenter, the router 120-a associated with the self-contained network services system 145-c may be separately configured for routing data to and from instances of network services applications executed by the network services modules 135.

It should be understood that the router 120-a may be any policy-based forwarding device, including, but not limited to, a conventional router, a special-purpose router, a virtual router implemented by a server, a layer-3 switch, a load balancer, and/or any other policy-based forwarding device. In certain examples, the router 120-a may perform a combination of level-3 routing and level-2 switching on packets distributed between the network services modules 135 and the network fabric 705.

The network services module 135-k executing the controller application 205-a may, like the other network services modules 135, be a commodity server 130. The network services module 135 executing the controller application 205-a may coordinate the deployment and removal of network services applications to the other dynamically configurable network services modules 135-l to 135-n. For example, network services module 135-k of the present example may execute an example of the controller application 205 described above with reference to FIG. 2A or 2B. It should be understood that all or a portion of network services module 135-k may be dynamically configurable, just like the other dynamically configurable network services modules 135-l to 135-n. Thus, the network services module 135-k executing the controller application 205-a may also execute one or more instances of other network services applications (e.g., firewall application 210, load balancer application 215, storage accelerator application 220, and/or security application 225 of FIG. 2).

Each of the dynamically configurable network services modules 135 may be configured to execute various network services applications to implement a desired network services functionality. The controller application 205-a of the present example may be configured to determine which network services applications, if any, are executed by each of the dynamically configurable network services modules 135 and deploy the appropriate software to each of the dynamically configurable network services modules 135. The controller application 205-a may dynamically deploy, remove, or reconfigure the network services applications executed by the dynamically configurable network services modules 135 as the demand for certain network services changes over time and/or by request of the management module 710. In certain examples, the controller application 205-a may activate or deactivate certain features of running instances of the network services applications.

Each of the dynamically configurable network services modules 135 may execute a special network services operating system with accelerated networking functionality, such as the network services operating system 365 described above with reference to the previous Figures.

Turning now to an example, the management module 710 may communicate with the controller application 205-a over an application programming interface (API) (e.g., an implementation of the Representational State Transfer (REST) API) or a graphical user interface (GUI) to provide a request for network services in the abstract. For instance, the management module 710 may convey a request to the controller application 205-a to activate load balancing service at 5.0 Gb per second with 1.0 million connections per second, and to enable Secure Sockets Layer (SSL) security in a datacenter.

The controller application 205-a may then determine how many instances of a load balancing application (e.g., the load balancing application 215 of FIG. 2A or 2B) and a security application (e.g., the security application 225 of FIG. 2A or 2B) to deploy to the dynamically configurable network services modules 135-l to 135-n to implement the requested network services. Additionally, the controller application 205-a may determine whether each instance of the security application is to be implemented as a virtual machine or on dedicated hardware.

Using the determined number of instances for each network service application and the decision to implement each instance as a virtual machine or on dedicated hardware, the controller application 205-a of network services module 135-k may generate a new software configuration for a number of the dynamically configurable network services modules 135 and configure the number of dynamically configurable network services modules 135 with the new software configuration to implement the desired number of instances of the load balancing and security applications.

Once the network services are configured, the controller application 205-a may then reconfigure the router 120-a to appropriately steer traffic to the network services modules 135 implementing the new network services, thereby providing the requested load balancing and SSL service. A key concept of the self-contained network services system 145-c is that the network may be reconfigured along with the servers implementing the dynamically configurable network services modules 135 to provide the requested network services.

Figure 8:
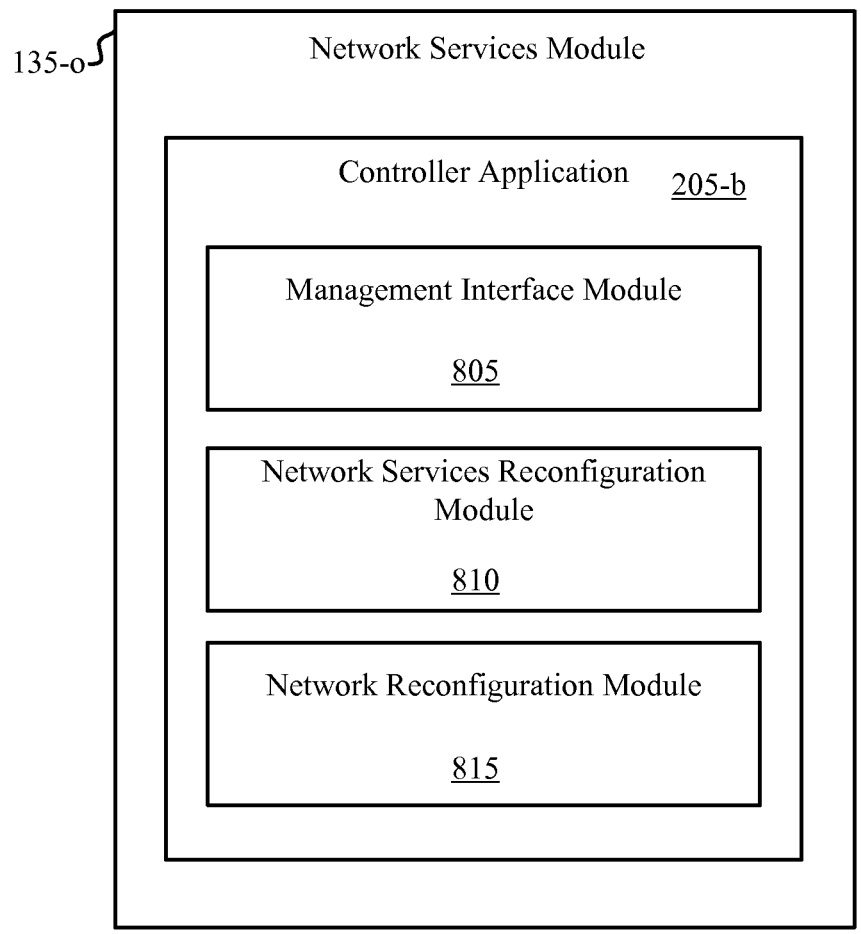
FIG. 8 is a block diagram of an example of a network services module including components configured according to various embodiments of the invention.

Referring next to FIG. 8, a more detailed block diagram of an example network services module 135-o running a controller application 205-b is shown. The network services module 135-o may be an example of one or more of the network services modules 135 described above with reference to the previous Figures. The controller application 205 may be an example of one or more of the controller applications 205 described above with reference to the previous Figures.

To provide dynamically configurable network services to a client network, the controller application 205-b of the present example may include at least a management interface module 805, a network services reconfiguration module 810, and a network reconfiguration module 815. Of course, the controller application 205-b may also implement other functionality and features according to the principles of the present specification. For the sake of clarity, however, the present example of FIG. 8 focuses on certain basic features of the controller application 205-b with respect to the deployment and dynamic configuration of network services in real-time.

The management interface module 805 may be configured to receive a request (e.g., over an API or GUI) for a change in network services provided by a self-contained network services system (e.g., self-contained network services system 145-c of FIG. 7) to a client network.

The network services reconfiguration module 810 may determine a new software configuration for a number of network services modules of the self-contained network services system based on the received request, and dynamically configure the network services modules according to the new software configuration.

In certain examples, determining the new software configuration for the network services modules may include identifying at least one network service application associated with the requested change in network services. In certain examples, a level of virtualization for each instance of one or more selected network service applications may be determined based on a priority of that network service application or another factor. One or more instances of the identified selected network service application may be dynamically loaded or removed from one or more of the network services modules to implement the requested change in network services.

In certain examples, the network services modules may be dynamically reconfigured according to the requested change while the same or a different set of network services modules is providing a set of existing network services to the network.

In certain examples, implementing the requested change may include receiving packets from the client network and processing the received packets with the self-contained network services modules according to the new configuration.

The network reconfiguration module 815 may reconfigure the client network and a router or other forwarding device associated with the self-contained network services system to steer network traffic from the client network to the instances of the network services applications running on the network services modules in accordance with the requested change and the new software configuration selected by the network services reconfiguration module 810.

Figure 9:
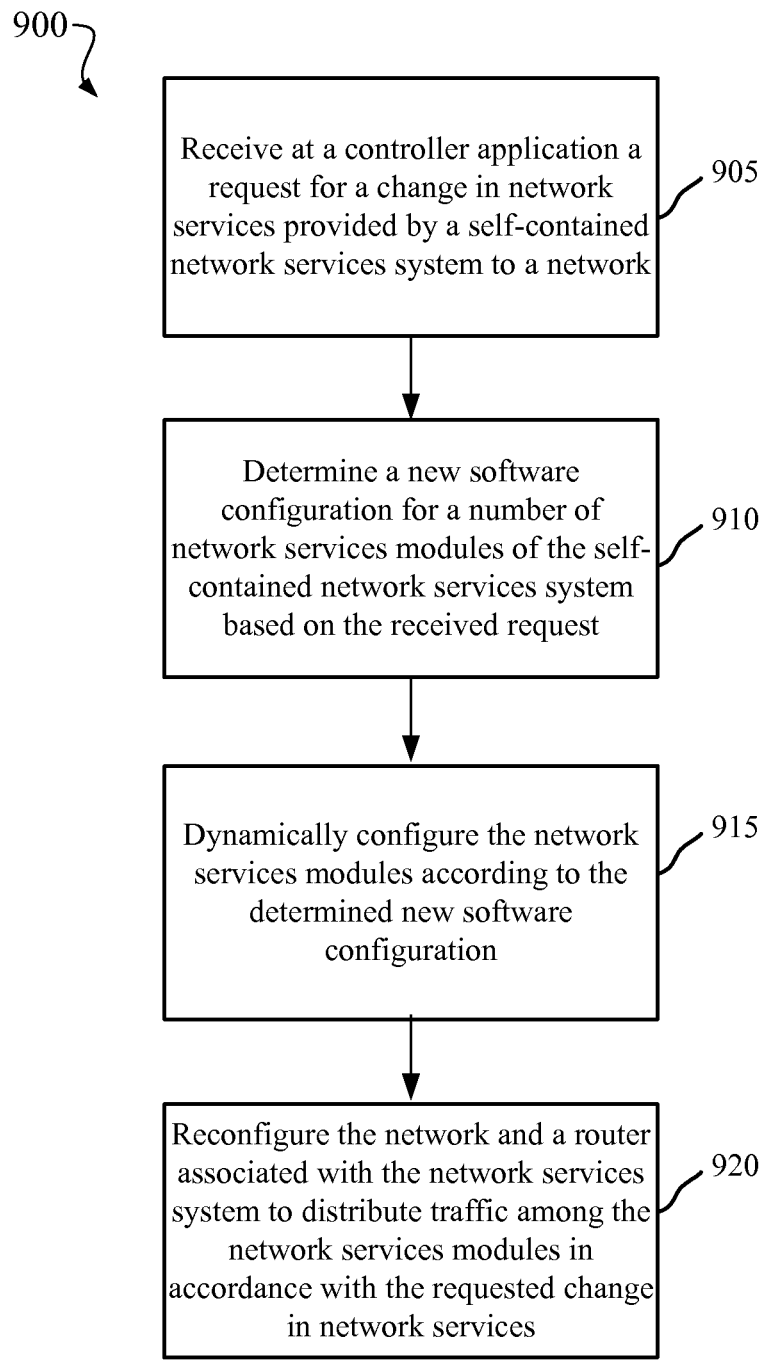
FIG. 9 is a flowchart diagram of an example of a method of managing network services according to various embodiments of the invention.

Referring next to FIG. 9, a flowchart is shown of an example of a method 900 of managing network services. The method 900 may be performed, for example, by one or more of the network services modules 135 and/or the network services operating system 365 described above with reference to the previous Figures. The self-contained network services system described in FIG. 9 may be an example of one or more of the self-contained network services systems 145 described above with reference to the previous Figures.

At block 905, a request may be received at a controller application for a change in network services provided by a self-contained network services system to a client network. At block 910, a new software configuration may be determined based on the received request for a number of network services modules of the self-contained network services system. At block 915, the network services modules may be dynamically configured according to the determined new software configuration. At block 920, the client network and a router associated with the self-contained network services system may be reconfigured to steer network traffic from the client network to instances of network services applications running on the network services modules according to the requested change and the new software configuration.

Figure 10:
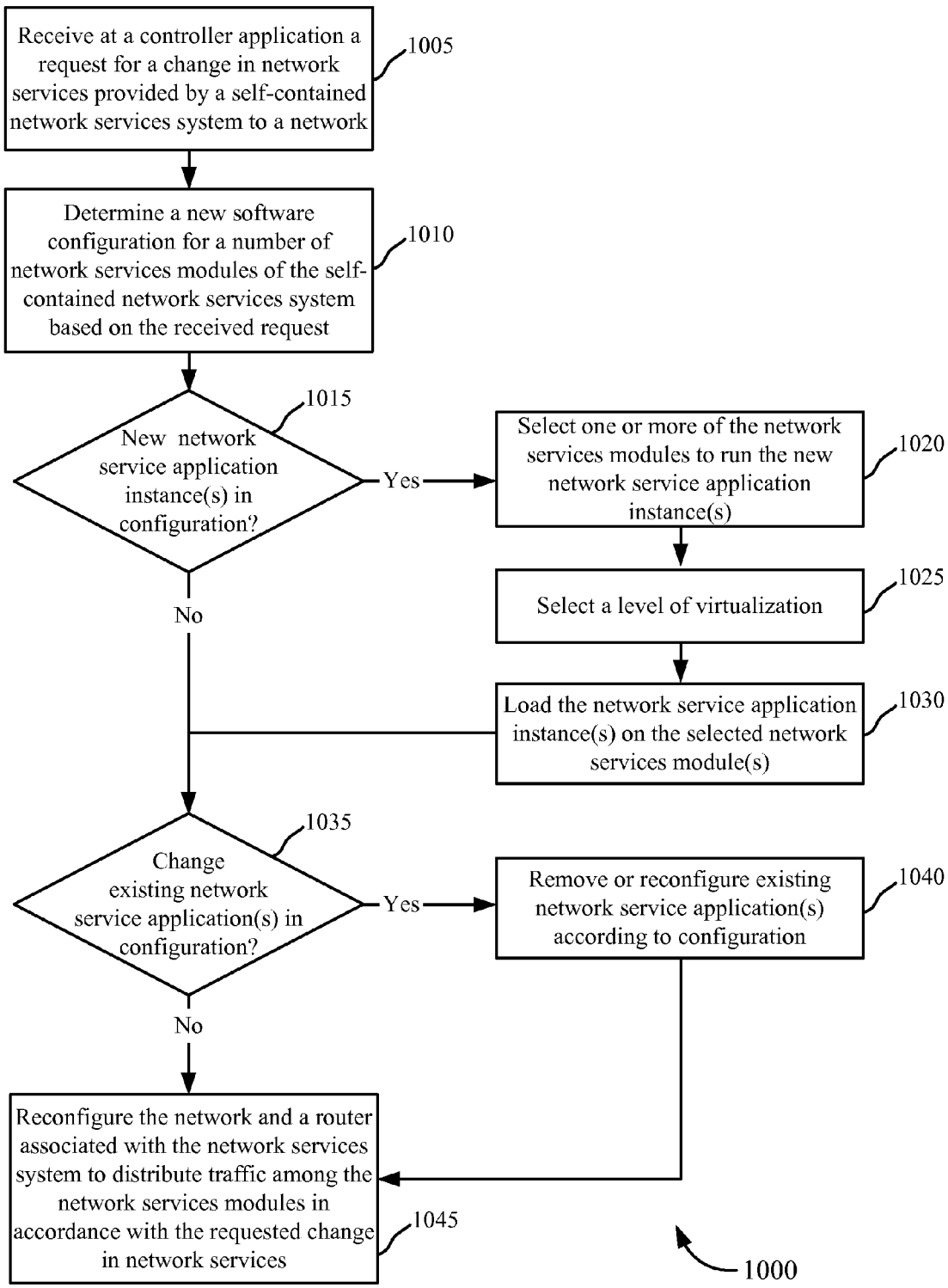
FIG. 10 is a flowchart diagram of another example of a method of managing network services according to various embodiments of the invention.

Referring next to FIG. 10, a flowchart is shown of an example of a method 1000 of managing network services. The method 1000 may be performed, for example, by one or more of the network services modules 135 and/or the network services operating system 365 described above with reference to the previous Figures. The self-contained network services system described in FIG. 10 may be an example of one or more of the self-contained network services systems 145 described above with reference to the previous Figures. The method 1000 may be an example of the method 900 of FIG. 9.

At block 1005, a request for a change in network services provided by a self-contained network services system to a network may be received at an instance of a controller application of the self-contained network services system. The requested change may include the addition of network services, the removal of network services, or some other change to network services. At block 1010, a new software configuration may be determined for a number of network service modules of the self-contained network services system based on the received request. At block 1015, it may be determined whether the new software configuration includes the addition of new network service application instances. For example, new network service application instances may be deployed in response to a request for a new network service or to expand the capacity of an existing network service.

If it is determined that the new software configuration includes the deployment of new network service application instances (block 1015, Yes), one or more of the network service modules may be selected to run the new network services application instance(s) at block 1020. The one or more network service modules may be selected based on processor or memory utilization, available bandwidth, requirements associated with the network services application to be deployed, or other relevant considerations. At block 1025, a level of virtualization for the new instance(s) of the network services application may be selected, and at block 1030, the network service application instance(s) may be loaded onto the selected network services modules.

Following deployment of the new network service application instance(s) or in response to a determination that the new software configuration does not include the deployment of new network service application instances (block 1015, No), a determination may be made at block 1035 as to whether the new software configuration includes a change to one or more existing instances of network services applications running at the self-contained network services system. Changes to the existing instances of network services applications may include removing one or more of the instances of the network services applications, changing parameters or a run-time environment associated with one or more instances of the network services applications, changing a level of virtualization of one or more instances of the network services applications, or other changes. If such changes are included in the new software configuration (block 1035, Yes), one or more network service application instances may be removed or reconfigured according to the new software configuration.

Following the removal or reconfiguration, or in response to a determination that no changes are to be made to the existing network service application instances (block 1035, No), the client network fabric and a router associated with the self-contained network services system may be reconfigured to distribute traffic among the network services modules in accordance with the requested change in network services.

Figure 11A:
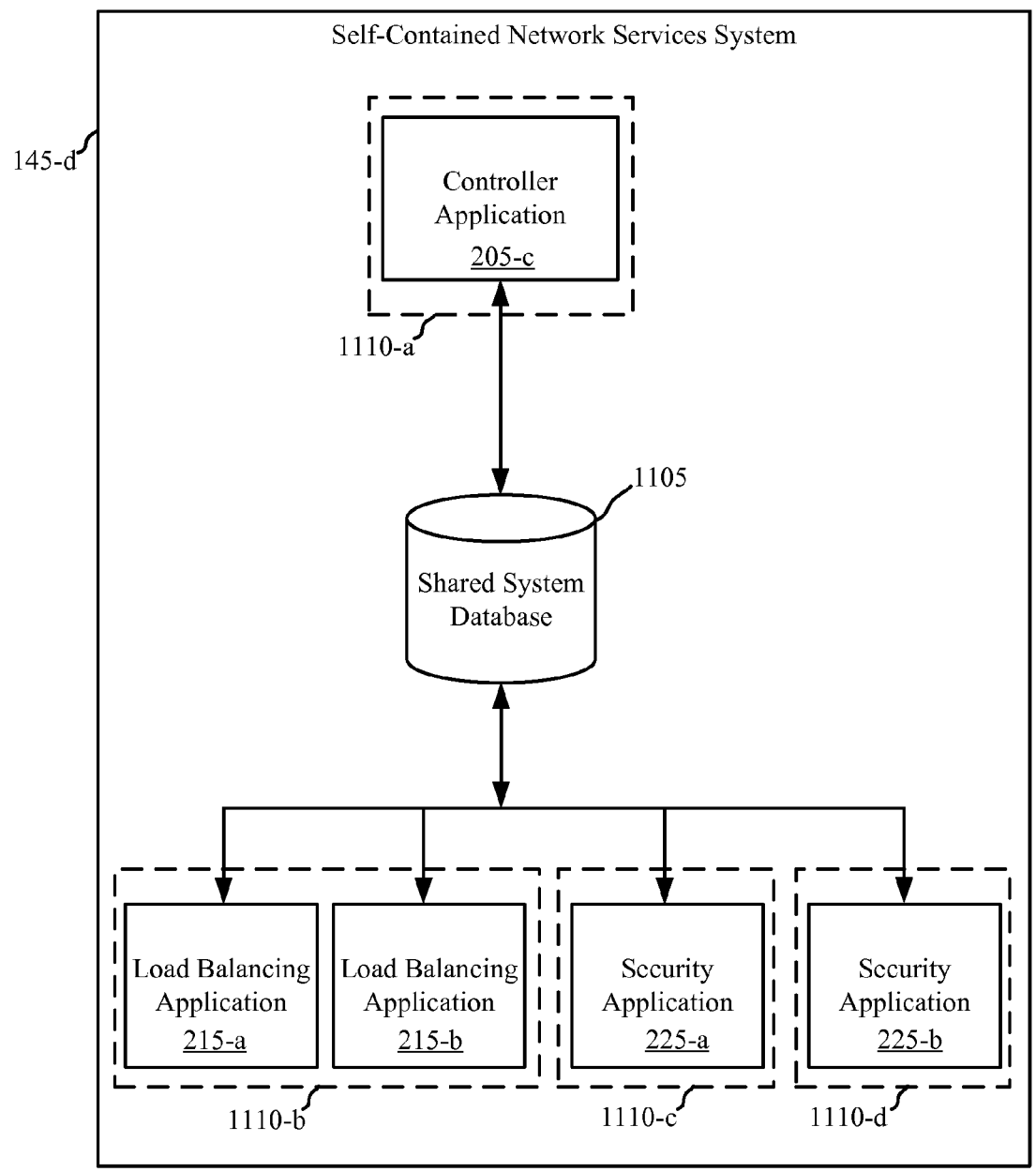
FIG. 11A is a block diagram of an example of a self-contained network services system including components configured according to various embodiments of the invention.
Figure 11B:
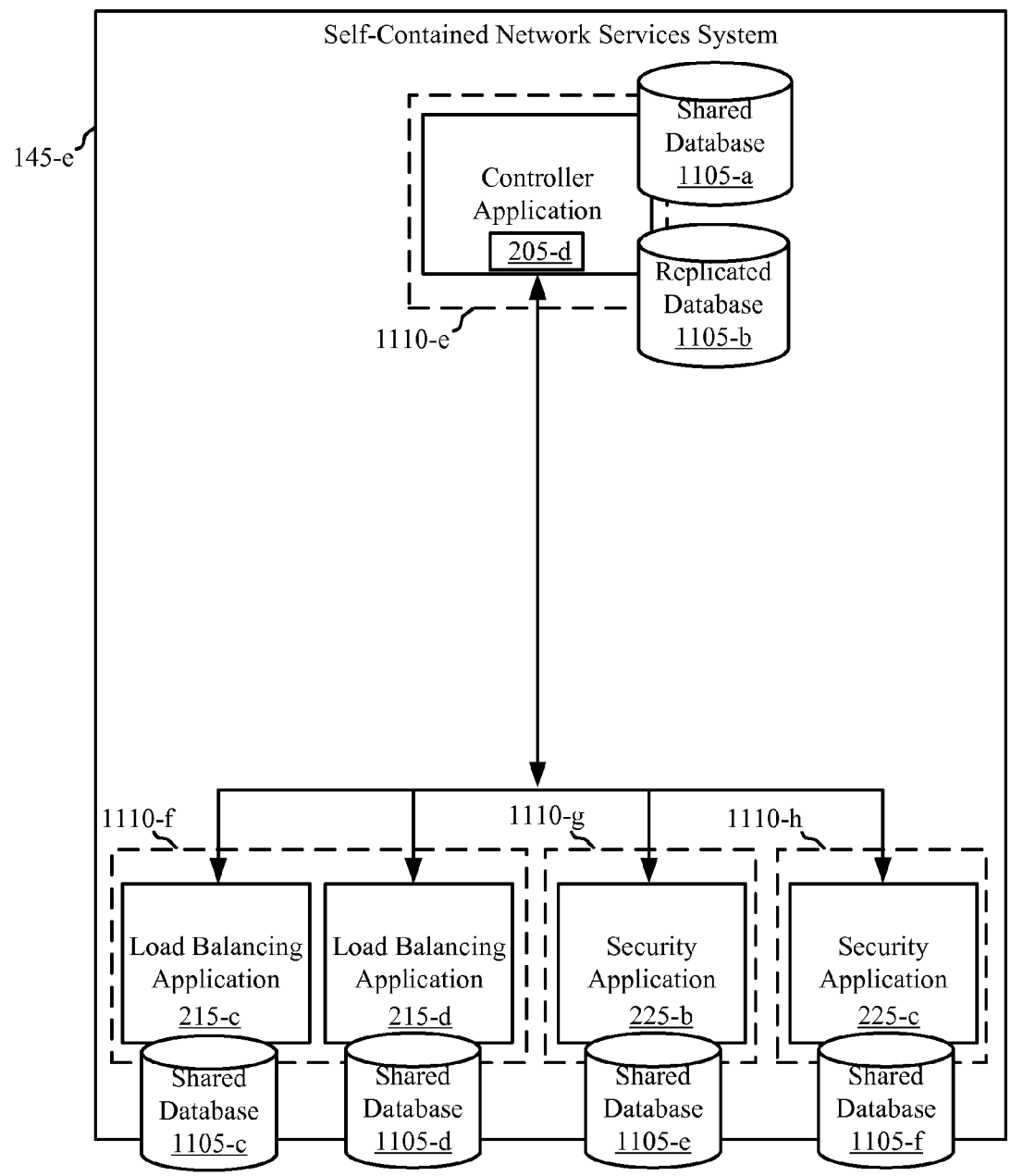
FIG. 11B is a block diagram of an example of a self-contained network services system including components configured according to various embodiments of the invention.

Referring next to FIG. 11A and FIG. 11B, block diagrams of other examples of self-contained network services systems 145 are shown. The self-contained network services system 145 of FIGS. 11A and 11B may be examples of one or more of the self-contained network services system 145 described above with respect to previous Figures.

Each of the self-contained network services system 145 of FIGS. 11A and 11B may include a shared system database 1105 and various instances of network services applications 205, 215, 225. The network services applications 205, 215, 225 may be implemented by a number of network services modules (not shown) in the self-contained network services system 145, as according to the principles of the present description.

The network services applications 205, 215, 225 implemented by the self-contained network services systems 145 of FIGS. 11A and 11B may include at least one instance a controller application 205, multiple instances of a load balancing application 215, and multiple instances of a security application 225. The controller application 205 may be an example of the controller application 205 described above with reference to FIG. 2A or 2B, or the network service applications 370 described above with reference to FIG. 3B or 4. The load balancing application 215 may be an example of the load balancing application 215 described above with reference to FIG. 2A or 2B, or the network service applications 370 described above with reference to FIG. 3B or 4. The security application 225 may be an example of the security application 225 described above with reference to FIG. 2A or 2B, or the network service applications 370 described above with reference to FIG. 3B or 4.

While the present examples are described in the context of the load balancing application 215 and the security application 225, it should be understood that these same principles may be applied to self-contained network services systems implementing any combination of network service application types.

The self-contained network services systems 145 of FIGS. 11A and 11B may be implemented by a number of servers (e.g., servers 130 described in the previous Figures) distributed among one or more physical racks. Dashed lines 1110 demonstrate one example of application distribution among different physical racks. Thus, in FIG. 11A, an instance of the controller application 205-*c* may be implemented by a real or virtual server on a network services module implemented in a first rack 1110-*a*, multiple instances of the load balancing application 215 may be implemented by separate real or virtual servers on a network services module implemented in a second rack 1110-*b*, a first instance of the security application 225 may be implemented by a real or virtual server on a network services module implemented in a third rack 1110-*c*, and a second instance of the security application 225 may be implemented on a network services module implemented by a real or virtual server in a fourth rack 1110-*d*.

In previous solutions for providing network services, special-purpose hardware is provided in custom chassis having special-purpose cards that communicate with each other over dedicated physical communication lines and a communications protocol with which to transfer state between nodes. By contrast, the systems and methods of the present disclosure enable the provisioning of network services using commodity servers distributed among one or more racks without dedicated physical communication lines between servers. The communication system as described may mimic the communications capabilities of a chassis between the network services modules contained within a self-contained network services system 145, and shall therefore be referred to as a virtual chassis.

With reference to FIG. 11A, to allow for communication between the instances of the network services applications 205, 215, 225 without dedicated network services communication lines, the self-contained network services system 145-*d* may provide each processor implementing an instance of the network services applications 205, 215, 225 access to a shared system database 1105. The shared system database 1105 may be implemented over a network accessible to each network services module implementing one of the network services applications 205, 215, 225. The shared system database 1105 may also be accessed via shared-memory or over the server's local networking provided by the operating system. Each instance of the network services applications 205, 215, 225 may be configured to store updated state information in a portion of the shared system database 1105 allocated to that instance.

In the example of FIG. 11A, the shared system database 1105 may be a fully distributed database where each server in each node locally stores its own state information. In such examples, each server 130 may be queried individually for its portion of the database. In additional or alternative examples, the shared system database 1105 of FIG. 11A may be a fully centralized database that stores local state information for each of the servers in a single repository. As shown in the example of FIG. 11B, the shared database 1105 may be implemented as a distributed database with partial replication in which one or more network services applications, such as the controller application 205-*b*, replicate state information from the servers that is used for metering in a replicated database 1105-*b*. The state information in the replicated database 1105-*b* may allow for persistence in the presence of catastrophic node failures, while still allowing for the scalability and speed of a distributed database for other functions.

Because each instance of a network service application 205, 215, 225 may be able to view state information for each other network service application instance through the shared system database 1105, the various instances of the network services applications 205, 215, 225 may communicate with each other by storing and reading each other's state information in the shared system database 1105.

Additionally, the shared system database 1105 may be used to propagate changes throughout the self-contained network services system 145. For example, the controller application 205-*b* of FIG. 11A may determine a current configuration of each server in the self-contained network services system 145-*d* by reading state information from the shared system database 1105. In this way, the controller application 205-*b* may determine an updated software configuration for each server when a change for network services is received. The controller application 205-*b* may communicate the updated software configuration for each network services module by writing an indication of the updated software configuration for each network services module to the shared system database 1105. Each network services module may then access the shared system database 1105 to retrieve its updated software configuration and update accordingly.

Figure 12:
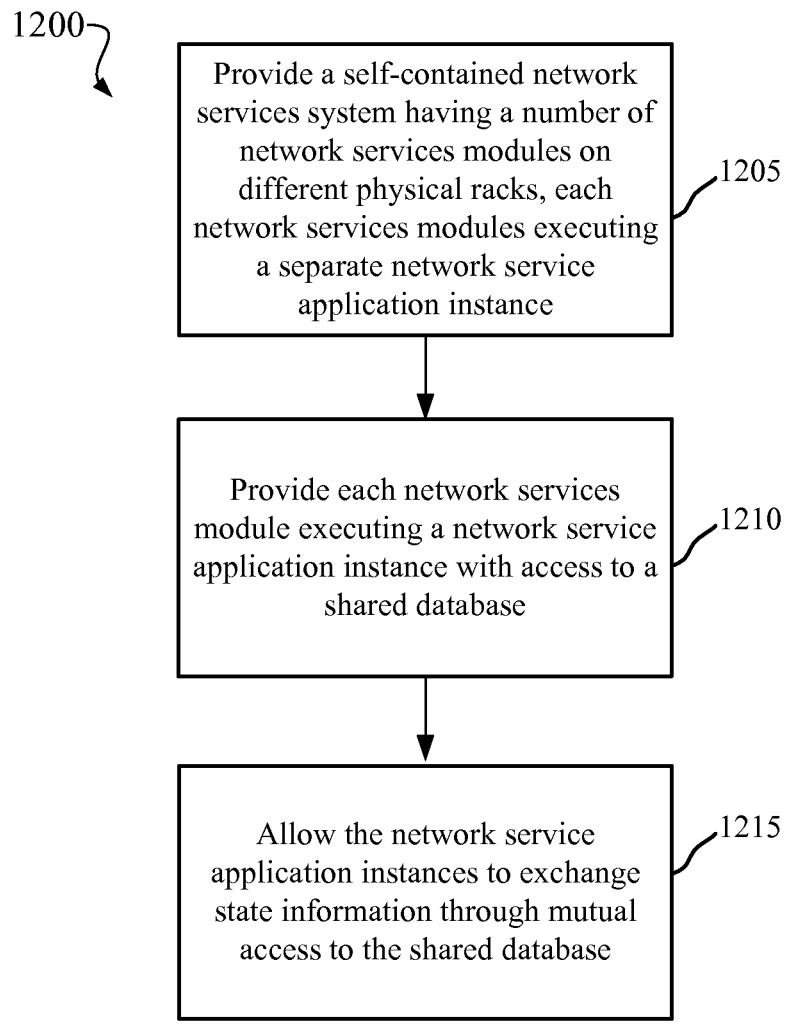
FIG. 12 is a flowchart diagram of an example of a method of managing a self-contained network services system according to various embodiments of the invention.

Referring next to FIG. 12, a flowchart is shown of an illustrative method 1200 of managing a self-contained network services system. The method 1200 may be performed, for example, by one or more of the network service modules 135 or the network services operating system 365 described above with reference to the previous Figures. The self-contained network services system may be an example of the self-contained network services system 145 described above with reference to the previous Figures.

At block 1205, a self-contained network services module may be provided. The self-contained network services system may have a number of network services modules in different physical racks, each network services module executing a separate instance of a network service application. At block 1210, each network services module implementing a network service application may be provided with access to a shared database. At block 1215, the network service application instances may be allowed to exchange state information through mutual access to the shared database. Additionally or alternatively, as described above with reference to FIGS. 11A and 11B, software changes may be propagated through the self-contained network services system by updating the shared database.

Figure 13A:
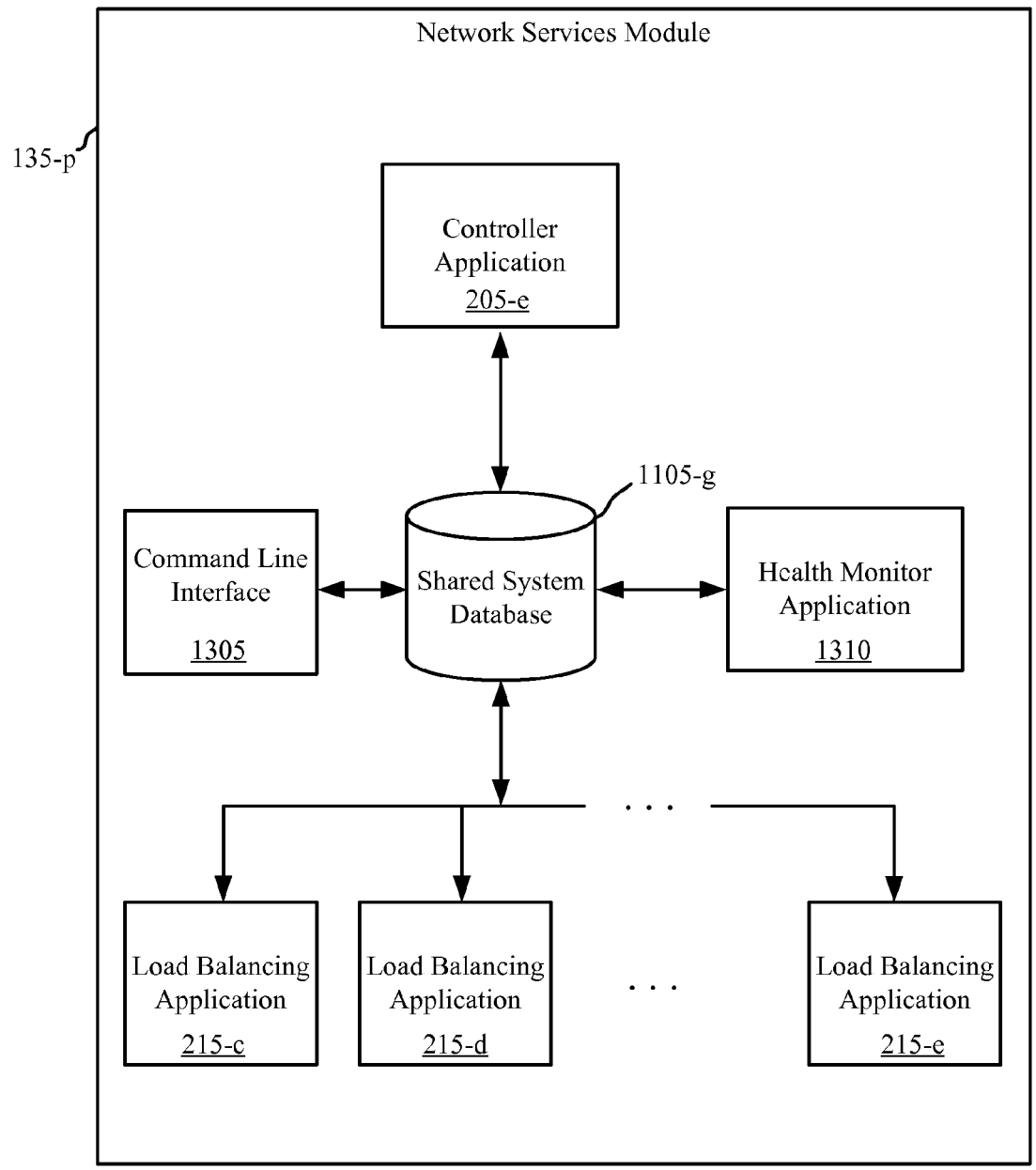
FIG. 13A is a block diagram of an example of a network services module including components configured according to various embodiments of the invention.

Referring next to FIG. 13A, a block diagram of another example of a network services module 135-*p* is shown. The network services module 135-*p* of FIG. 13 may be an example of one or more of the network services modules in a self-contained network services system 145 described above with respect to the previous Figures. The network services module 135-*p* of the present example may include an instance of a controller application 205, a number of instances of a load balancing application 215, a shared system database 1105-*g*, a command line interface 1305, and an instance of a health monitor application 1310. Each of these components may be in communication, directly or indirectly.

The instance of the controller application 205 of FIG. 13A may be an example of one or more of the controller applications 205 and/or the network service applications 370 described above with reference to previous Figures. The instances of the load balancing application 215 may be examples of one or more of the load balancing applications 215 and/or the network service applications 370 described above with reference to previous Figures. The shared system database 1105-g may be an example of one or more of the shared system databases 1105 described above with reference to previous Figures.

The present example is described in the context of a load balancing application 215 running on a single instance of a network services module 135-p running on a real or virtual server. However, it should be understood that these same principles may be applied to any network services modules of a self-contained network services system 145 implementing any combination of network service application types.

The separate instances of the load balancing application 215 may be implemented as separate processes rather than separate threads of the same process. In this way, if one of the instances of the load balancing application 215 crashes, the functionality of the remaining instances of the load balancing application 215 may continue unaffected, thereby allowing the load balancing service to continue during diagnosis and/or restarting of the failed instance. Moreover, during the period between the crash or termination of a process and its being restarted, the remaining processes may be configured to assume the duties and workload of the crashed instance. By spreading the network service of load balancing across multiple processes, the risk of system performance being crippled by a single crash may be reduced.

The shared system database 1105-g of FIG. 13A may be accessible to the controller application 205 instance, the command line interface 1305, the health monitor application 1310 instance, and the load balancing application 215 instances. Similar to the shared system databases 1105 of FIGS. 11A and 11B, the shared system database 1105-g of FIG. 13A may store state information for each of the application instances. The health monitor application 1310 may monitor the state information for each of the application instances stored in the share system database 1105-g to dynamically detect and remedy problems arising with the application instances.

For example, each instance of the load balancing application 215 may store state information in the shared system database 1105-g. If one instance of the load balancing application 215 crashes, the health monitor application 1310 may detect the crash from the state information stored for that instance of the load balancing application 215 from the shared system database 1105-g. Upon detecting the crash, the health monitor application 1310 may divert new load balancing tasks away from the crashed instance and to other healthy instances of the load balancing application 215. The health monitor application 1310 may cause the controller application 205-e to attempt to restart the crashed instance of the load balancing application 215 and/or create a new instance of the load balancing application 215.

In another example, the health monitor application 1310 may determine from the shared system database 1105-g that one or more instances of the load balancing application 215 is overloaded and in danger of crashing. In response, the health monitor application 1310 may divert new load balancing tasks away from the overloaded instances of the load balancing application 215 and/or cause the controller application 205-e to create one or more new instances of the load balancing application 215.

Figure 13B:
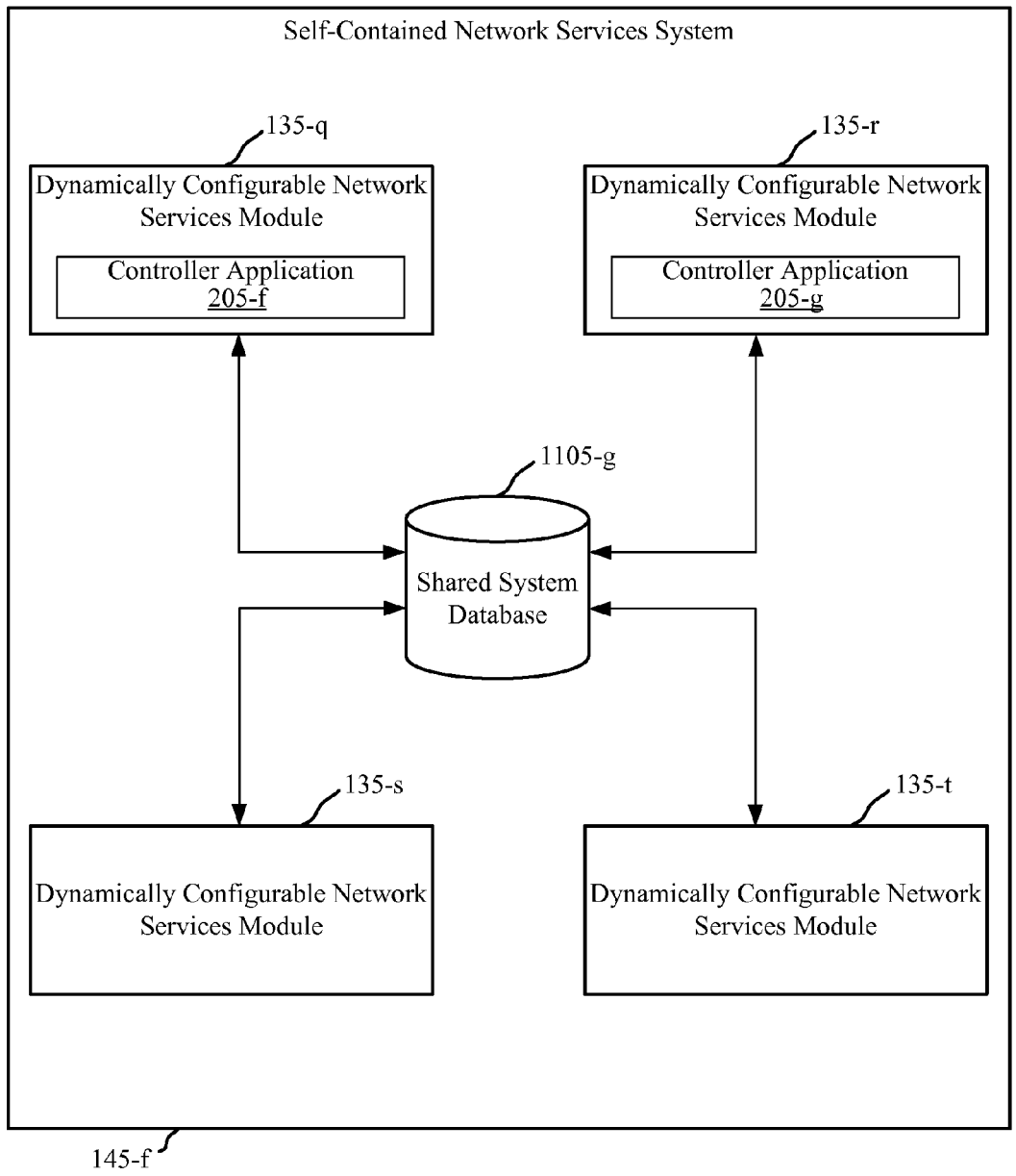
FIG. 13B is a block diagram of an example of a self-contained network services system including components configured according to various embodiments of the invention.

Referring next to FIG. 13B, a block diagram of a self-contained network services system 145-f is shown. In the example of FIG. 13B, the self-contained network services system 145-f includes a number of dynamically configurable network services modules 135 and a shared system database 1105-g. The self-contained network services system 145-f may be an example of one or more the self-contained network services systems 145 described in the previous Figures. The dynamically configurable network services modules 135 may be an example of one or more of the dynamically configurable network services modules 135 described in the previous Figures. The shared system database 1105-b may be an example of one or more of the shared system databases 1105 described above with reference to the previous Figures.

In the self-contained network services system 145-f of the present example, each of the dynamically configurable network services modules 135 may be in communication with the shared system database 1105-g. State information for the applications executed by each of the dynamically configurable network services modules 135 may be centrally stored and/or replicated to the shared system database 105-g. In the present example, dynamically configurable network services modules 135-o and 135-p may each execute an instance of controller application 205. Among other management tasks, the controller application 205 may detect that an entire network services module 135 has failed, at which point the controller application 205 may discontinue service delivery to the failed module 135, provision a new network services module 135, and then direct new traffic to the new network services module 135.

Certain details regarding how service to the failed network services module 135 is handled may be specific to a particular set of circumstances and/or implementation of the self-contained network services system 145 to ensure the best delivery of services. In some cases, it may be better to allow traffic destined for the failed network services module 135 to not be serviced until a replacement module is provisioned. Alternatively, in certain cases it may be better to redirect traffic destined for the failed network services module 135 to redundant network service applications provided by other network services modules 135 while waiting for the replacement network services module 135 to be provisioned.

Figure 14:
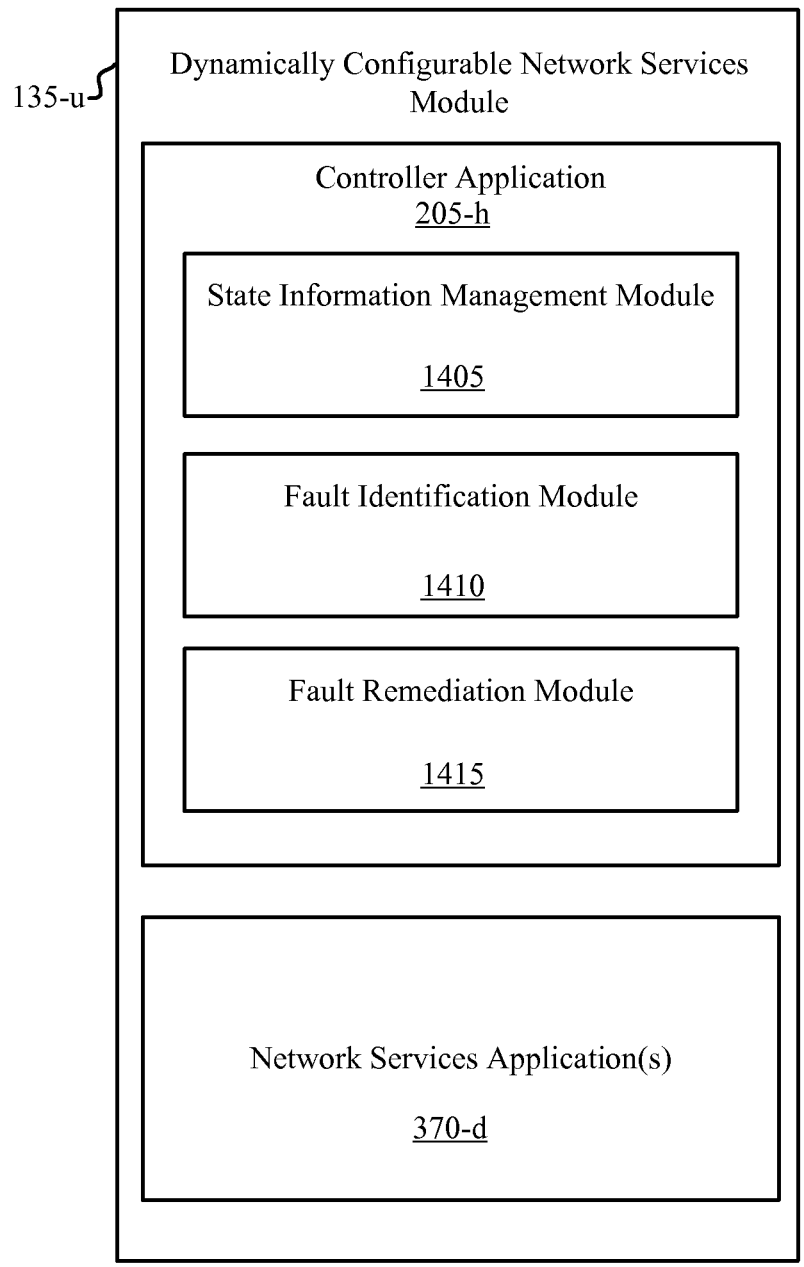
FIG. 14 is a block diagram of an example of a network services module including components configured according to various embodiments of the invention.

Referring next to FIG. 14, a block diagram of an example network services module 135-u running a controller application 205-h and one or more network services applications 370-d is shown. The network services module 135-u may be implemented by a number of commodity servers 130 or other processors. The network services module 135-u may be an example of one or more of the network services modules 135 described above with reference to the previous Figures. The controller application 205-h may be an example of one or more of the controller applications 205 described above with reference to the previous Figures. The network services application(s) 370-d running on the network services module 135-u may be an example of one or more of the network services applications 210, 215, 220, 225, 370 described above with reference to previous Figures.

To provide self-healing functionality to the network services module 135-u and/or to an entire self-contained network services system 145, the controller application 205-h of the present example may include at least a state information management module 1405, a fault identification module. Of course, the controller application 205-h may also implement other functionality and features according to the principles of the present specification. For the sake of clarity, however, the present example of FIG. 14 focuses on certain basic features of the controller application 205-h with respect to self-healing in the event of a faulty network services application 370 or other failure.

The state information management module 1405 may be configured to store state information in a shared memory (e.g., a shared system database 1105 as described in the previous Figures) for each instance of a network service application 370-*d* implemented by the network services module 135-*u* and/or the self-contained network services system 145. The fault identification module 1410 may be configured to identify a fault in one of the network service application 370-*d* instances running on the network services module 135-*u* or on another network services module 135 based on the state information stored within the shared memory. In certain examples, the fault identification module 1410 may detect the failure of an entire other network services module 135 in the self-contained network services system 145. The fault remediation module 1415 may be configured to dynamically remedy the identified fault in the one of the network service application 370-*d* instances.

As discussed above, remediation of the identified fault may include discontinuing deliverance of tasks or other network traffic to the identified faulty network service application 370-*d* instance in response to the identified fault. In certain examples, remediation of the identified fault may include restarting the faulty network service application 370-*d* instance in response to the identified fault, and restoring a state of the faulty network service application 370-*d* to the restarted network service application 370-*d* instance based on the state information stored within the shared memory. Alternatively, the restarted network services application 370-*d* instance may start with a fresh state. In certain examples, the delivery of tasks or other network traffic to the restarted network service application 370-*d* instance may resume.

In additional or alternative examples, the fault remediation module 1415 may remedy the identified fault by launching a replacement network service application 370-*d* instance on a separate processor or the same processor to replace the identified one of the network service application instances. The state of the faulty network service application 370-*d* may then be restored to the replacement network service application 370-*d* instance based on the state information stored within the shared memory, or alternatively, the replacement network service application 370-*d* may start with a fresh state. The fault remediation module 1415 may reconfigure the self-contained network services system to deliver tasks associated with the identified faulty network service application instance to the replacement network service application instance.

In additional or alternative examples, the fault remediation module 1415 may reconfigure the self-contained network services system to deliver tasks associated with the identified faulty network service application 370-*d* instance to a redundant instance of the same network service application 370-*d* that is already running.

Figure 15:
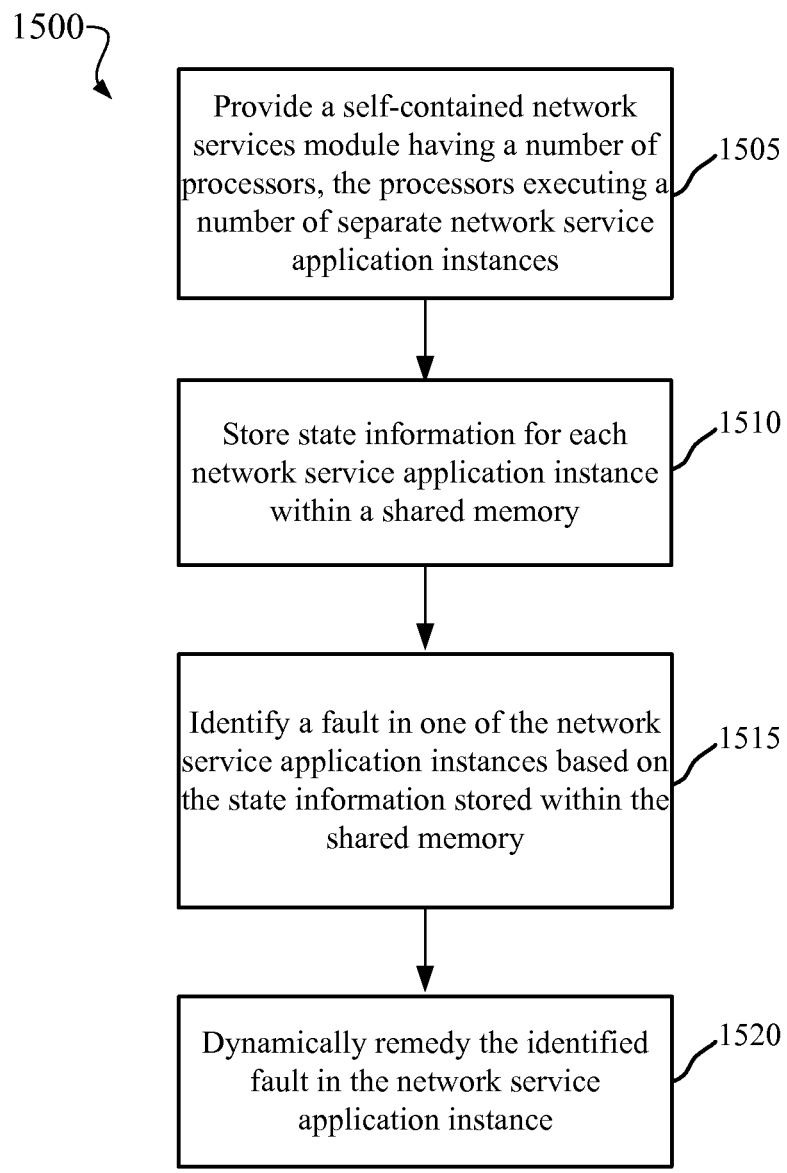
FIG. 15 is a flowchart diagram of an example of a method of managing a self-contained network services system according to various embodiments of the invention.

Referring next to FIG. 15, a flowchart is shown of an illustrative method 1500 of managing a self-contained network services system. The method 1500 may be performed, for example, by one or more of the network service modules 135 or the network services operating system 365 described above with reference to the previous Figures. The self-contained network services system may be an example of the self-contained network services system 145 described above with reference to the previous Figures.

At block 1505, a self-contained network services module having a number of processors may be provided, where the processor(s) execute a number of separate network service application instances. At block 1510, state information for each network service application instance may be stored within a shared memory, such as a shared system database. At block 1515, a fault may be identified in one of the network service application instances based on the state information stored within the shared memory. At block 1520, the identified fault in the network service application instance may be dynamically remedied as discussed above.

Figure 16A:
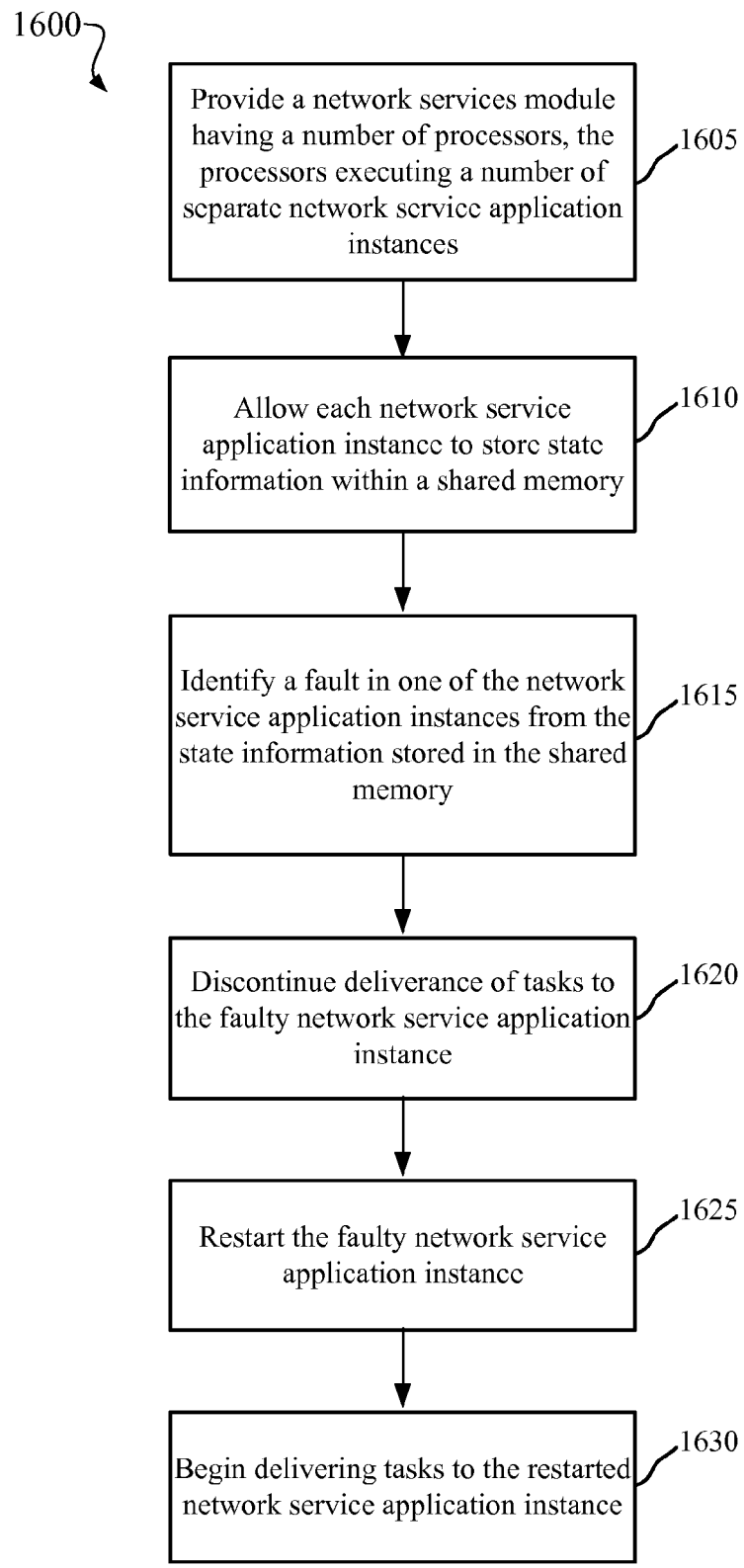
FIG. 16A is a flowchart diagram of an example of a method of managing a self-contained network services system according to various embodiments of the invention.
Figure 16B:
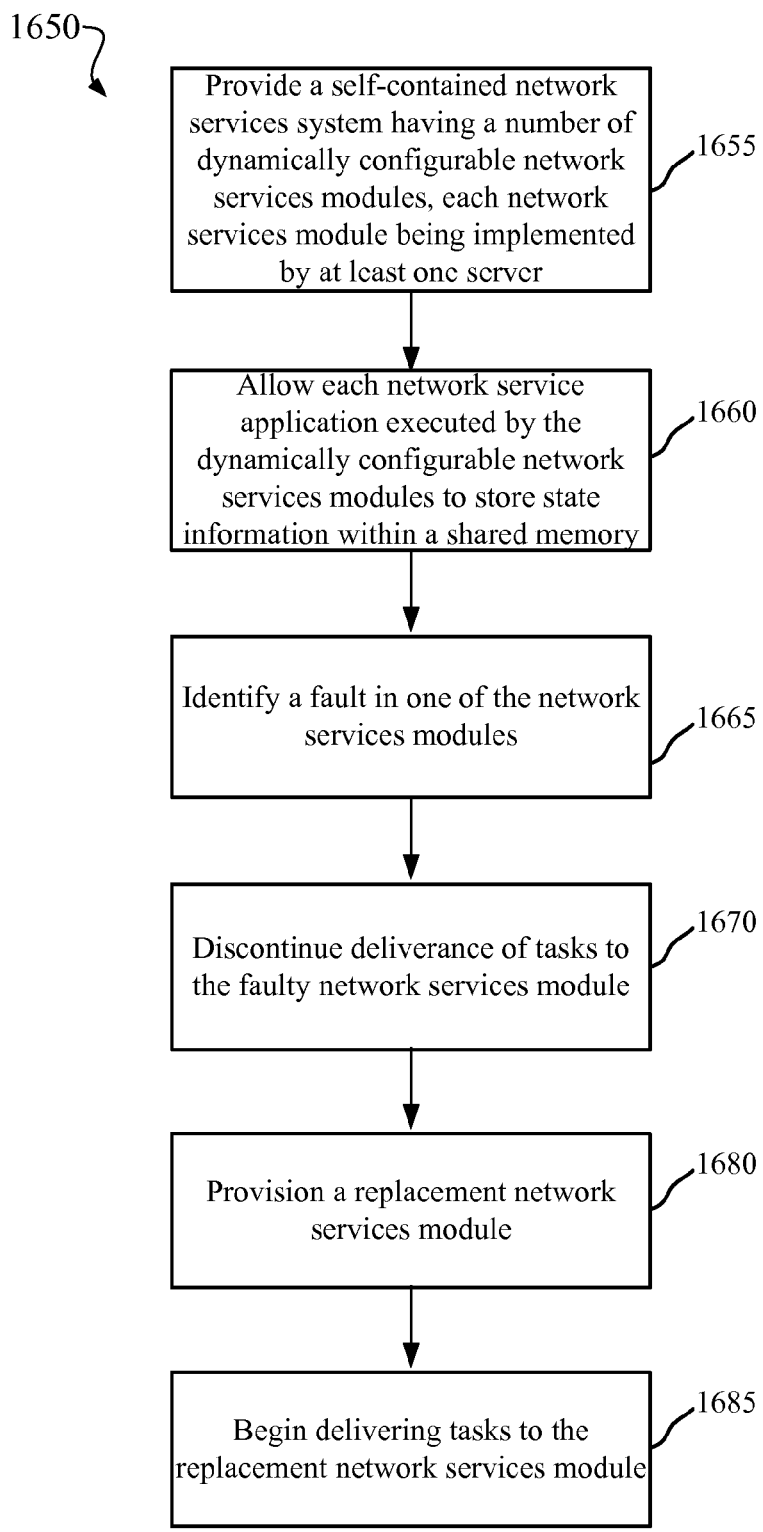
FIG. 16B is a flowchart diagram of an example of a method of managing a self-contained network services system according to various embodiments of the invention.

Referring next to FIGS. 16A and 16B, flowcharts are shown of illustrative methods 1600, 1650 of managing a self-contained network services system. The methods 1600, 1650 may be performed, for example, by one or more of the network service modules 135 or the network services operating system 365 described above with reference to the previous Figures. The self-contained network services system may be an example of the self-contained network services system 145 described above with reference to the previous Figures. The methods 1600 of FIGS. 16A and 16B may be examples of the method 1500 of FIG. 15.

Specifically, the methods 1600, 1650 may be performed by a controller application and a health monitor application in the self-contained network services module in a network services operating system environment. The controller application may be an example of the controller application 205 or the network services application 370 described above with reference to the above Figures. The health monitor application may be an example of the health monitor application 1310 or the network services application 370 described above with reference to the above Figures. The network services module may be an example of a network services module 135 or the network services application 370 described above with reference to the above Figures.

Referring specifically to the method 1600 of FIG. 16A, at block 1605, a network service module may be provided. The network service module may include a number of processors, the processors executing a number of separate instances of network service applications. At block 1610, each of the instances of the network service applications may be allowed or instructed to store state information for itself within a shared database. At block 1615, a fault may be determined in an instance of one of the network service applications based on state information stored by that instance in the shared memory. At block 1620, deliverance of new tasks to the faulty instance may be discontinued. At block 1625, the faulty instance of the network service application may be restarted, and at block 1630, task delivery to the restarted instance of the network service application may begin.

Referring specifically to the method 1650 of FIG. 16B, at block 1655, a self-contained network services system may provided, the self-contained network services system having a number of dynamically configurable network services modules. Each network services module may be implemented by at least one server. At block 1660, each network service application executed by the dynamically configurable network services modules may be allowed to store state information within a shared database or other type of shared memory. At block 1660, a fault may be determined in one of the network services modules. At block 1670, deliverance of new tasks to the faulty network services module may be discontinued. At block 1675, a replacement network services module may be provisioned, and at block 1680, task delivery to the replacement network services module may begin.

Figure 17:
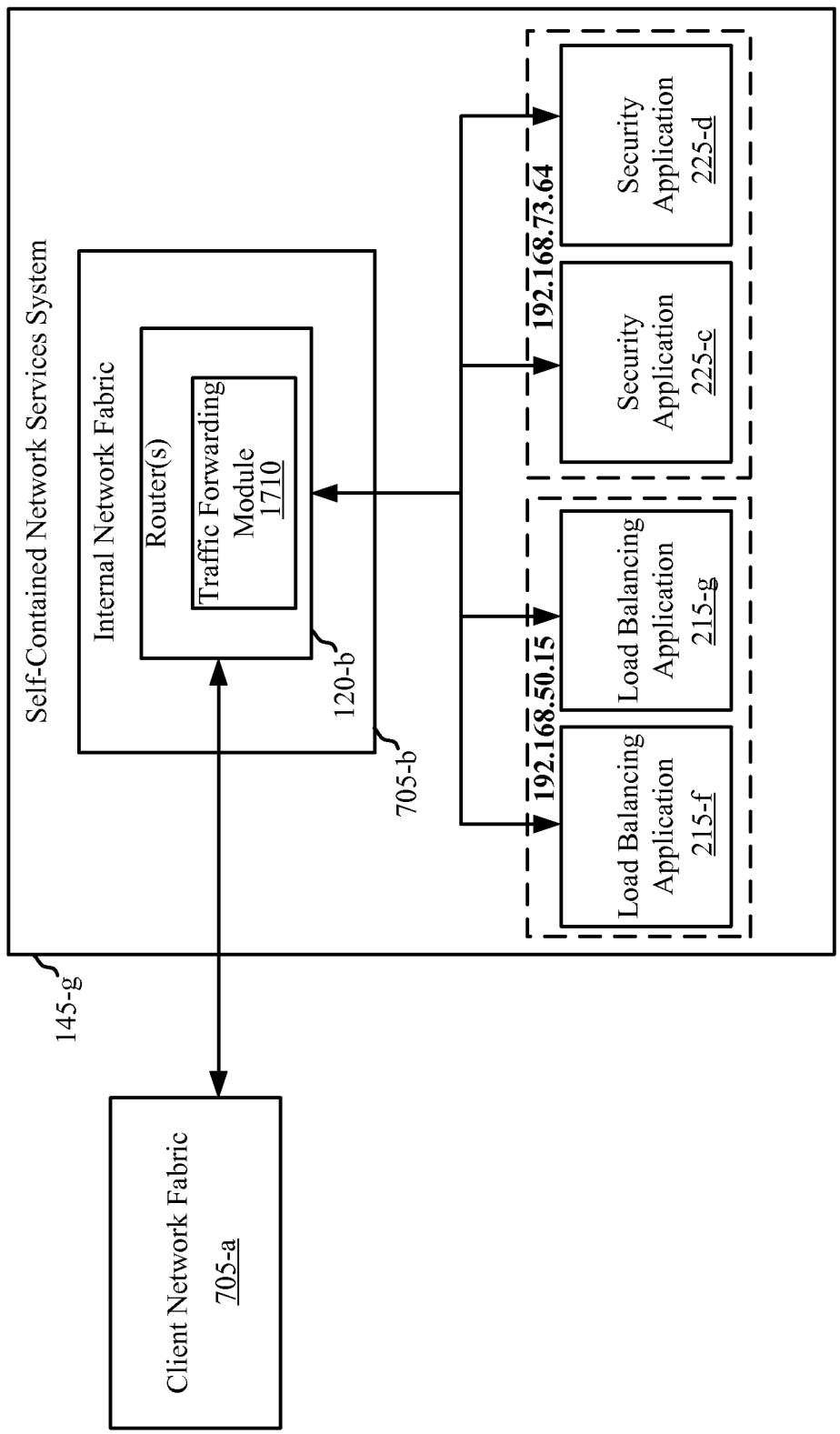
FIG. 17 is a block diagram of an example of a self-contained network services system including components configured according to various embodiments of the invention.

Referring next to FIG. 17, a block diagram of another example of a self-contained network services system 145-*g* is shown. The self-contained network services system 145-*g* of FIG. 17 may be an example of one or more of the self-contained network services systems 145 described above with respect to previous Figures.

The self-contained network services system 145-*g* may be configured to provide network services to a client network associated with a client network fabric 705-*a*. The self-contained network services system 145-*g* of the present example may include an internal network fabric 705-*b*, a number of instances of a load balancing application 215, and a number of instances of a security application 225. The load balancing application 215 and the security application 225 may be examples of the load balancing application 215 and the security application 225 and/or of the network service applications 370 described above with reference to the previous Figures. Each of these components may be in communication, directly or indirectly.

The present example is described in the context of separate instances of the load balancing application 215 and the security application 225 for simplicity in explanation. However, it should be understood that these same principles may be applied to self-contained network services systems 145 implementing any combination of network service application types.

The self-contained network services system 145-g of the present example may provide network services (e.g., load balancing and SSL security) to a client network over the client network fabric 705-a. The client network fabric 705-a may include switches, routers, and other transmission devices and media for the client network. The client network fabric 705-a may be an example of the network fabric 705 described above with reference to FIG. 7.

It may be desirable to distribute network service tasks in parallel between multiple, redundant network service application instances that provide the same functionality. For example, it may be desirable to divide load balancing tasks from the client network between a first instance and a second instance of the load balancing application 215. Similarly, it may be desirable to divide SSL security tasks from the client network between a first instance and a second instance of the security application 225. This redundancy may provide improved efficiency and resilience.

The client network may transmit all network service tasks of a particular type to the self-contained network services system 145-f using a single IP address. One way to evenly distribute network service tasks between redundant modules at the same IP address may be to reconfigure routers in the network fabric 705-a of the client network to enable a routing protocol that distributes the network service tasks. For example, Equal Cost Multi-Path routing (ECMP) may be used to evenly distribute network tasks between two instances of a network services application when each instance of the network services application advertises a path of the same cost to a common address. However, reconfiguring the routers of the client network fabric 705-a requires access to router configurations of the client network, which many network administrators may be reluctant to give to third-party network solutions providers. Address Resolution Protocol (ARP) manipulation may provide redundancy capability without altering the router configurations of the client network, but it does not allow for the distribution of traffic to a single IP address between redundant network services application instances.

The self-contained network services system 145-f of the present example may address these issues by providing an internal network fabric 705-b, separate from the client network fabric 705-a, and separately configuring the internal network fabric 705-b to distribute the network service tasks according to a defined policy. The internal network fabric 705-b may include at least one router 120-b or other forwarding device disposed at a port of entry to the internal network fabric 705-b from the client network fabric 705-a. The router 120-b may be an example of one or more of the routers 120 described above with reference to previous Figures.

The internal network fabric 705-b may not be a part of the network fabric 705-a of the client network, and hence need not be subject to management restrictions in place for the network fabric 705-a of the client network. For example, ECMP routing may be enabled at a traffic forwarding module 1710 of the router 120-b associated with the internal network fabric, even if the client network fabric 705-a forbids ECMP routing.

In this way, redundant instances of the same network service application may advertise routes of equal length to a destination IP address associated with the network service offered by that particular application. Consequently, the redundant instances of the application may trick the router 120-b into thinking that the different instances of the same network services application are simply equally viable next hops in a network path to the destination IP address, causing the router to divide and forward all traffic directed to that destination IP address among the redundant instances of the network service application. The redundant instances of the network service application may then process the tasks directed to the destination IP address in parallel.

As an example, consider the case shown in FIG. 13, in which load balancing tasks may be transmitted over the network fabric 705-a to the self-contained network services system 145-f at IP address 192.168.50.15 and security tasks may be transmitted to IP address 192.168.73.64. The first instance and the second instance of the load balancing application 215 may each advertise themselves to the router 120-b as equally viable paths to 192.168.50.15. For example, the first instance and the second instance of the load balancing application 215 may each advertise that they can forward packets to 192.168.50.15 in an equal number of hops or an equal amount of time.

Thus, the router 120-b may see the first instance and the second instance of the load balancing application 215 as equally viable next hops to 192.168.50.15, and use ECMP routing to evenly distribute network flows or packets addressed to 192.168.50.15 to the first instance and the second instance of the load balancing application 215. In some examples, the router 120-b may use hash-based distribution or another distribution method to balance the network flows or packets between the redundant instances of load balancing application 215. Thus, even though the separate instances of the load balancing application 215 may have IP addresses unique to 192.168.50.15, the load balancing tasks may be evenly distributed to and processed by the first instance and the second instance of the load balancing application 215. A similar procedure may be used to cause SSL tasks directed to IP address 192.168.73.64 to be evenly distributed to and processed by the first instance and the second instance of the security application 225.

While the foregoing examples have been given in the context of repurposing ECMP routing to distribute network tasks of the same type between redundant instances of network services applications, it will be understood that other types of routing or forwarding protocols may also be used to distribute the network tasks. Examples of other routing or forwarding protocols that may be used to distribute the network tasks amount redundant instances of network services applications include, but are not limited to, link aggregation control protocol (LACP) and OpenFlow.

Figure 18:
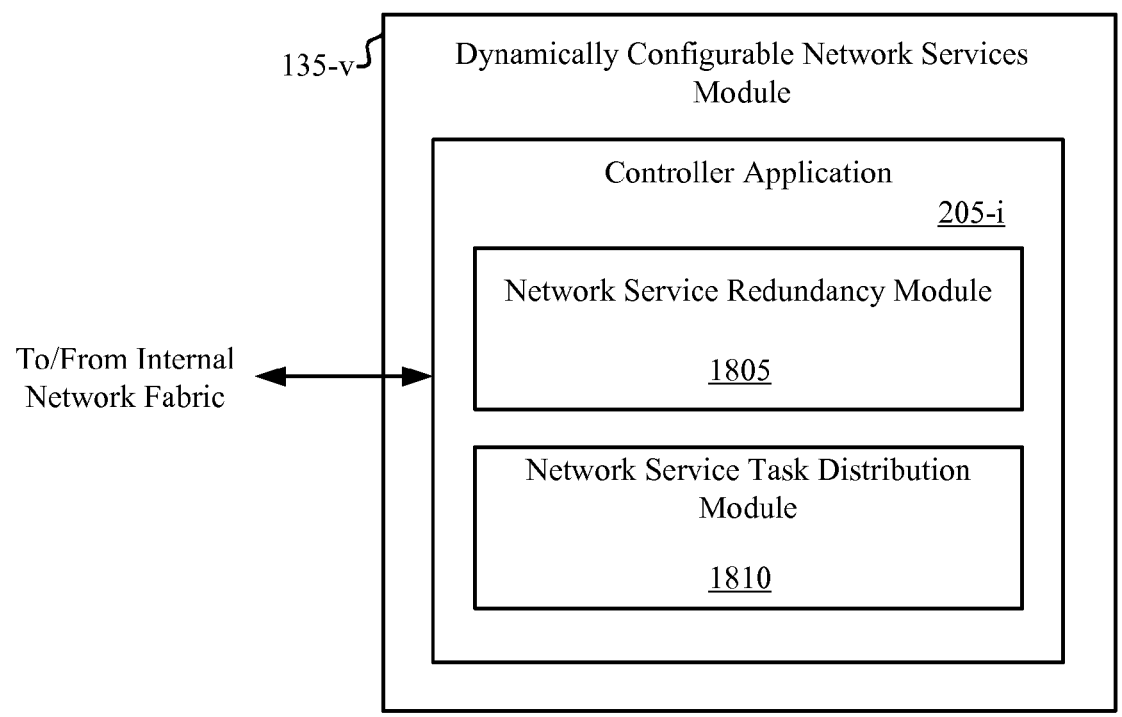
FIG. 18 is a block diagram of an example of a network services module including components configured according to various embodiments of the invention.

Referring next to FIG. 18, a block diagram of an example network services module 135-v running a controller application 205-i is shown. The network services module 135-v may be implemented by one or more commodity servers 130 or other processors. The network services module 135-v may be an example of one or more of the network services modules 135 described above with reference to the previous Figures. The controller application 205-i may be an example of one or more of the controller applications 205 described above with reference to the previous Figures.

To provide redundancy of network services to restricted networks, the controller application 205-i of the present example may include at least a network service redundancy module 1805 and a network service task distribution module 1810. Of course, the controller application 205-i may also implement other functionality and features according to the principles of the present specification. For the sake of clarity, however, the present example of FIG. 18 focuses on certain basic features of the controller application 205-i with respect to the provision of redundant network services.

The network service redundancy module 1805 may manage and track the provision of network services to a client network associated with a first network fabric by a self-contained network services system containing a number of network services modules running redundant instances of a network service application. As discussed above, the self-contained network services system may be associated with a second network fabric that is separate from the first network fabric.

The network service task distribution module 1810 may adapt the second network fabric to distribute network service tasks received from the client network and associated with the network service application among the redundant instances of the network service application. In certain examples, the network service task distribution module 1810 may update the configuration of the second network fabric in response to a change in the redundancy of network services provided by the self-contained network services module. Additionally or alternatively, the network service task distribution module 1810 may update the configuration of the second network fabric in response to an instruction from an administrator (e.g., over a command line interface, API, or GUI).

In certain examples, the second network fabric may include a router configured to route traffic between the first network fabric and the second network fabric, where the router is situated at a point of entry to the self-contained network services system. In such examples, the second network fabric may be adapted to distribute the network service tasks among the redundant instances of the network service application by programming the router to implement a routing or forwarding policy to accomplish the distribution (e.g., using repurposed ECMP as discussed above). In certain examples, network tasks of the same type may be transmitted from the first network fabric to the second network fabric using a common network address associated with the network task type, and the router may distribute the received network tasks among redundant network services application instances having different network addresses.

Figure 19:
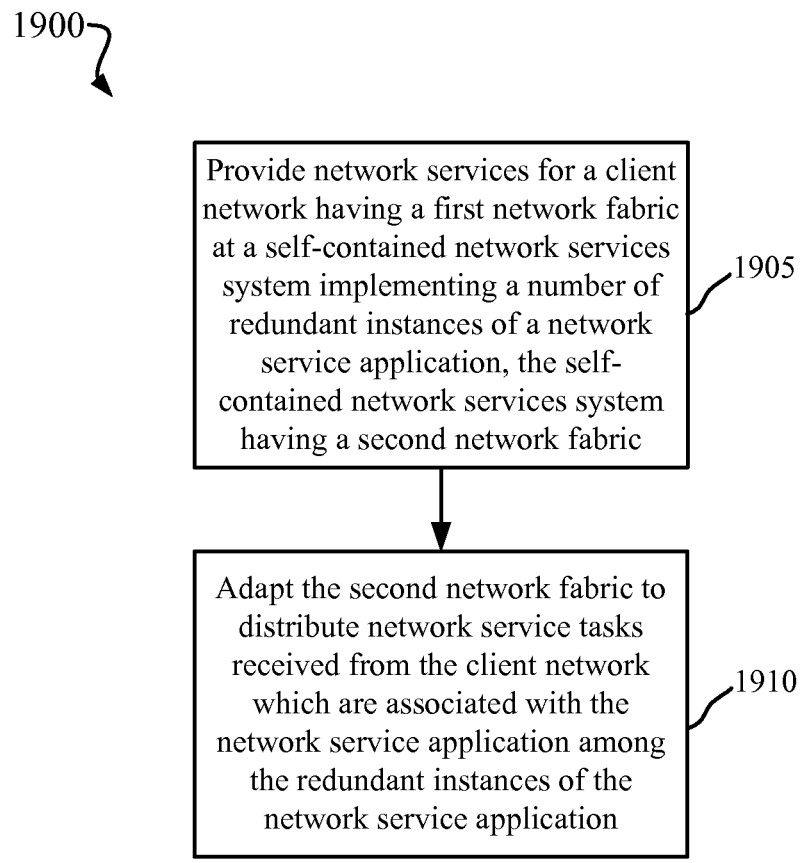
FIG. 19 is a flowchart diagram of an example of a method of managing a self-contained network services system according to various embodiments of the invention.

Referring next to FIG. 19, a flowchart is shown of an illustrative method 1900 of managing network services. The method 1900 may be performed, for example, by one or more of the network service modules 135, the network services operating system 365, the routers 120, switches 125, or other computing devices described above with reference to the previous Figures. The self-contained network services system may be an example of the self-contained network services system 145 described above with reference to the previous Figures.

At block 1905, network services may be provided for a client network associated with a first network fabric at a self-contained network services system. The self-contained network services system may implement a number of redundant instances of a network service application. The self-contained network services system may be associated with a second network fabric that is administratively independent from the first network fabric.

At block 1910, the second network fabric may be adapted to distribute network service tasks received from the client network which are associated with the network service application among the redundant instances of the network service application.

Figure 20:
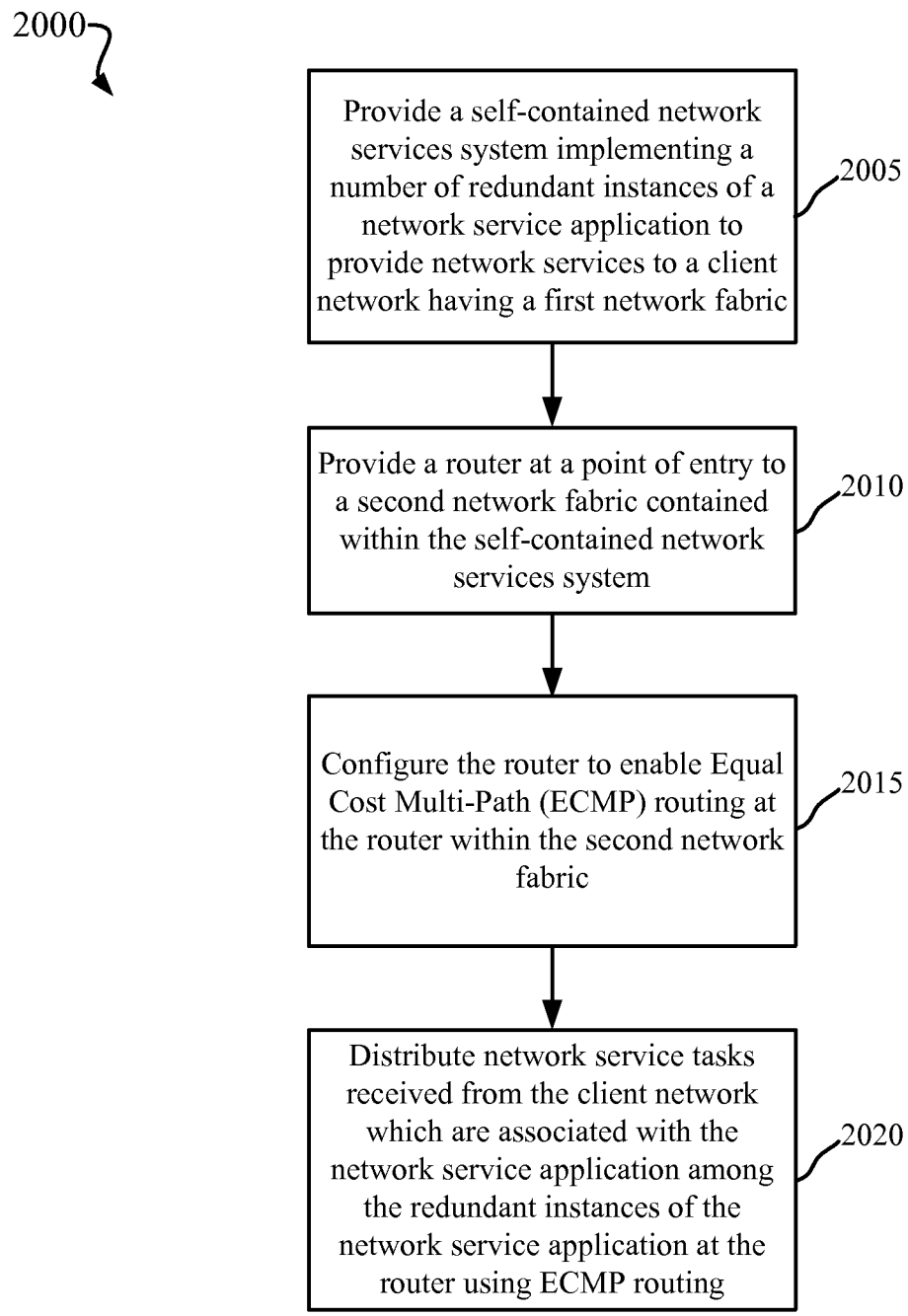
FIG. 20 is a flowchart diagram of an example of a method of managing a self-contained network services system according to various embodiments of the invention.

Referring next to FIG. 20, a flowchart is shown of an illustrative method 2000 of managing network services. The method 2000 may be performed, for example, by one or more of the network service modules 135, the network services operating system 365, the routers 120, switches 125, or other computing devices described above with reference to the previous Figures. The self-contained network services system may be an example of the self-contained network services system 145 described above with reference to the previous Figures.

At block 2005, a self-contained network services system may be provided. The self-contained network services system may implement a number of redundant instances of a network service application to provide network services to a client network having a first network fabric. At block 2010, a router may be provided at a point of entry to a second network fabric contained within the self-contained network services system. At block 2015, equal cost multi-path (ECMP) routing may be enabled at the router within the second network fabric. At block 2020, network service tasks received from the client network which are associated with the network service application may be distributed among the redundant instances of the network service application. This distribution may occur at the router using the ECMP routing according to the principles described herein.

Figure 21:
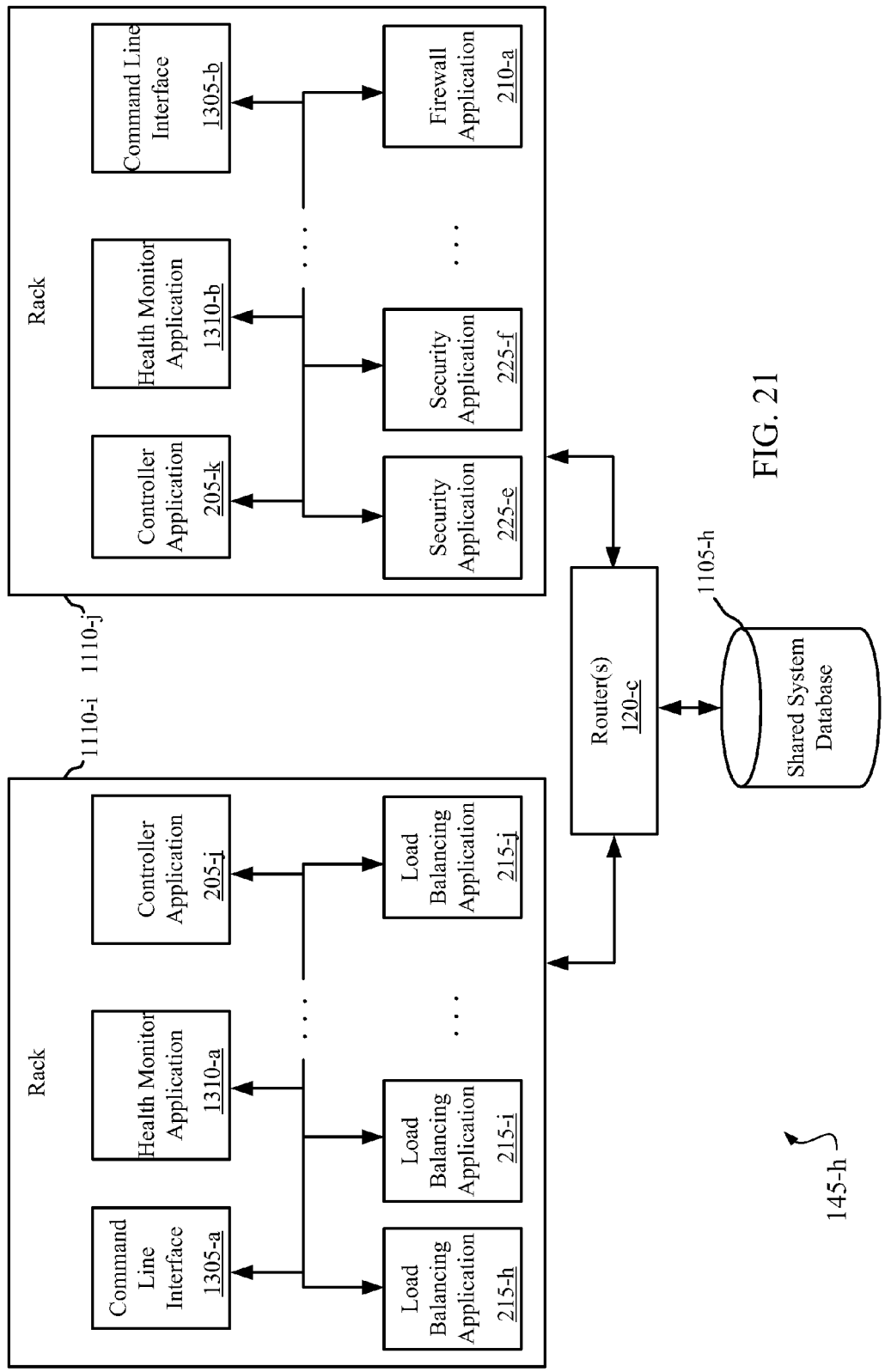
FIG. 21 is a block diagram of an example of a self-contained network services system including components configured according to various embodiments of the invention.

Referring next to FIG. 21, a block diagram of another example of a self-contained network services system 145-h is shown. The self-contained network services system 145-h of FIG. 15 may be an example of one or more of the self-contained network services system 145 described above with respect to the previous Figures.

Multiple racks 1110 may implement various aspects of the self-contained network services system 145-h of FIG. 21. For example, a first rack 1110-i may include a number of network service modules (e.g., network services modules 135 implemented by servers 130 as described herein) that separately implement a first instance of a controller application 205, a first instance of a command line interface 1305, a first instance of a health monitor application 1310, and a number of instances of a load balancing application 215. The second rack 1110-j may include a number of network services modules (e.g., network services modules 135 implemented by servers 130 as described herein) that separately implement a second instance of the controller application 205, a second instance of the command line interface 1305, a second instance of the health monitor application 1310, a number of instances of a security application 225, and a number of instances of a firewall application 210. However, it should be understood that the applications implemented in the second rack 1110-j need not replicate the applications implemented in the first rack 1110-i. In certain examples, each rack 1110 may implement a separate set of applications.

The controller application 205, the load balancing application 215, the security application 225, and the firewall application 210 may be examples of the controller application 205, the security application 225, and the firewall application 210, respectively, and/or the network service applications 370 described above with reference to the previous Figures. The command line interface 1305 and the health monitor application 1310 may be examples of the command line interface 1305 and the health monitor application 1310, respectively, and/or the network service applications 370 described above with reference to the previous Figures.

The racks 1110 may be interconnected through a number of routers 120-c. The routers 120-c may include one or more dedicated routers (e.g., router 120-a of FIG. 7) associated with a network fabric (e.g., the network fabric 705-b of FIG. 7) internal to the self-contained network services system 145-h that can distribute traffic to every network services module within the self-contained network services system 145-h. The routers 120-c may also include a number of routers within a client network fabric (e.g., the network fabric 705-a of FIG. 7).

The network service application instances of the racks 1110 may communicate with each other over a virtual chassis (e.g., a logical backplane) to coordinate functionality and access a shared system database 1105-h (e.g., the shared system database 1105 of the previous Figures) according to the principles described herein. Individual network service modules or self-contained network services systems may discover existing self-contained network service systems through a discovery mechanism such as a dedicated protocol or a repurposed routing protocol. For example, Address Resolution Protocol may be used between the separate instances of the controller application 205 to discover each other by broadcasting ARP packets to a number of IP addresses associated with network services. The network service module or self-contained network services system may then decide to join the virtual-chassis of an existing self-contained network services module and may then communicate with each other to exchange information about the network service applications implemented by each chassis and to establish network paths between the various network service application instances.

In other examples, multicast or other protocols and technologies may be designed or repurposed to discover nodes and configure the logical backplane.

Figure 22:
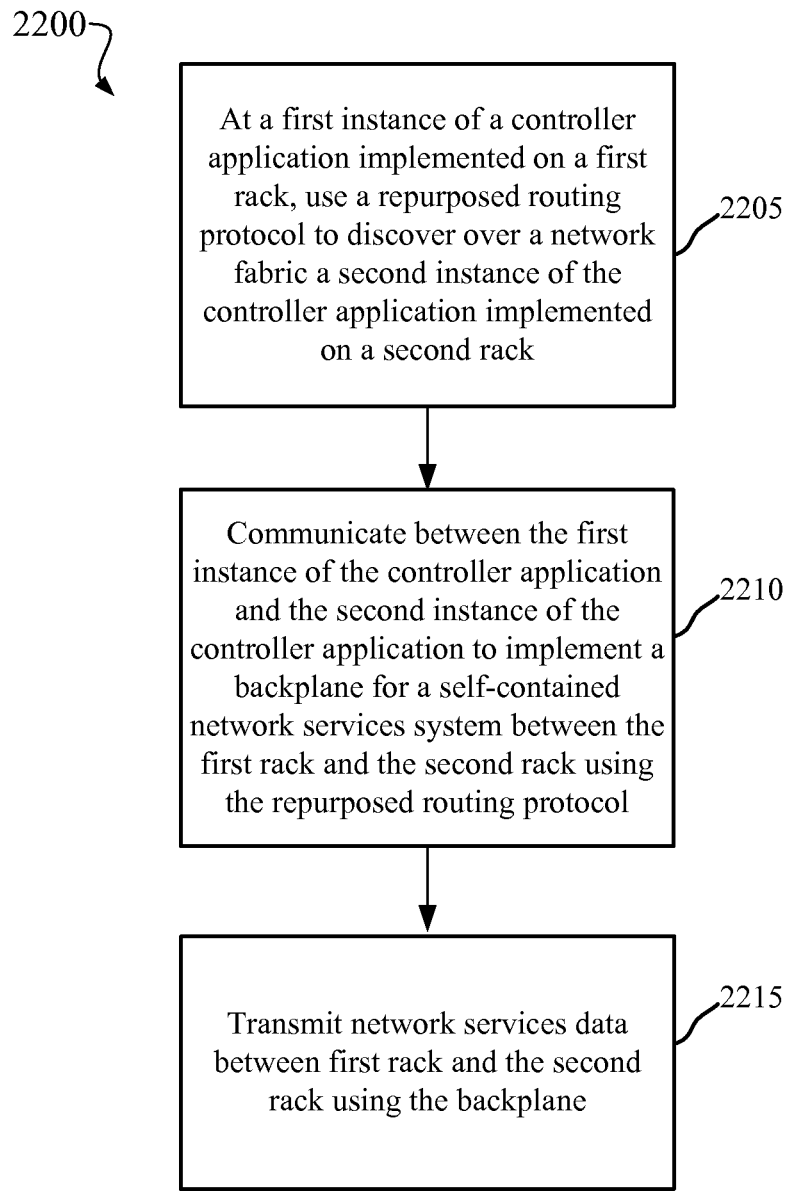
FIG. 22 is a flowchart diagram of an example of a method of managing a self-contained network services system according to various embodiments of the invention.

Referring next to FIG. 22, a flowchart is shown of another example of a method 2200 of managing a self-contained network services system. The method 2200 may be performed, for example, by one or more of the network service modules 135, the network services operating system 365, the routers 120, switches 125, or other computing devices described above with reference to the previous Figures. The self-contained network services system may be an example of the self-contained network services system 145 described above with reference to the previous Figures.

At block 2205, a first instance of a controller application implemented on a network services module as part of a self-contained network services system on a first rack may use a repurposed routing protocol to discover and identify over a network fabric a second instance of a self-contained network services module implemented on a second rack. In certain examples, each self-contained network services module may implement a single virtual chassis. Also, there may be more than one controller application for each self-contained network services system to provide redundancy.

At block 2210, a first instance of the controller application contained in the first self-contained network services system may communicate with a second instance of the controller application contained in the second self-contained network services system to implement a unified virtual chassis to logically merge the disparate sets of network services modules together. The virtual chassis may enable communication for the newly joined self-contained network services system containing the network services modules of both the first self-contained network services module and the second self-contained network services modules. In certain examples, the discovery mechanism between the self-contained network services modules is different from the configuration and communication protocol.

At block 2215, network services data may be transmitted between the network services modules in the first and second racks using the unified virtual-chassis. In additional or alternate examples, network services modules from racks or chassis not running a local controller application may discover existing controller applications running on other network services modules. In this way, a network services module can join an existing backplane without needing to run a local instance of the controller application.

Figure 23:
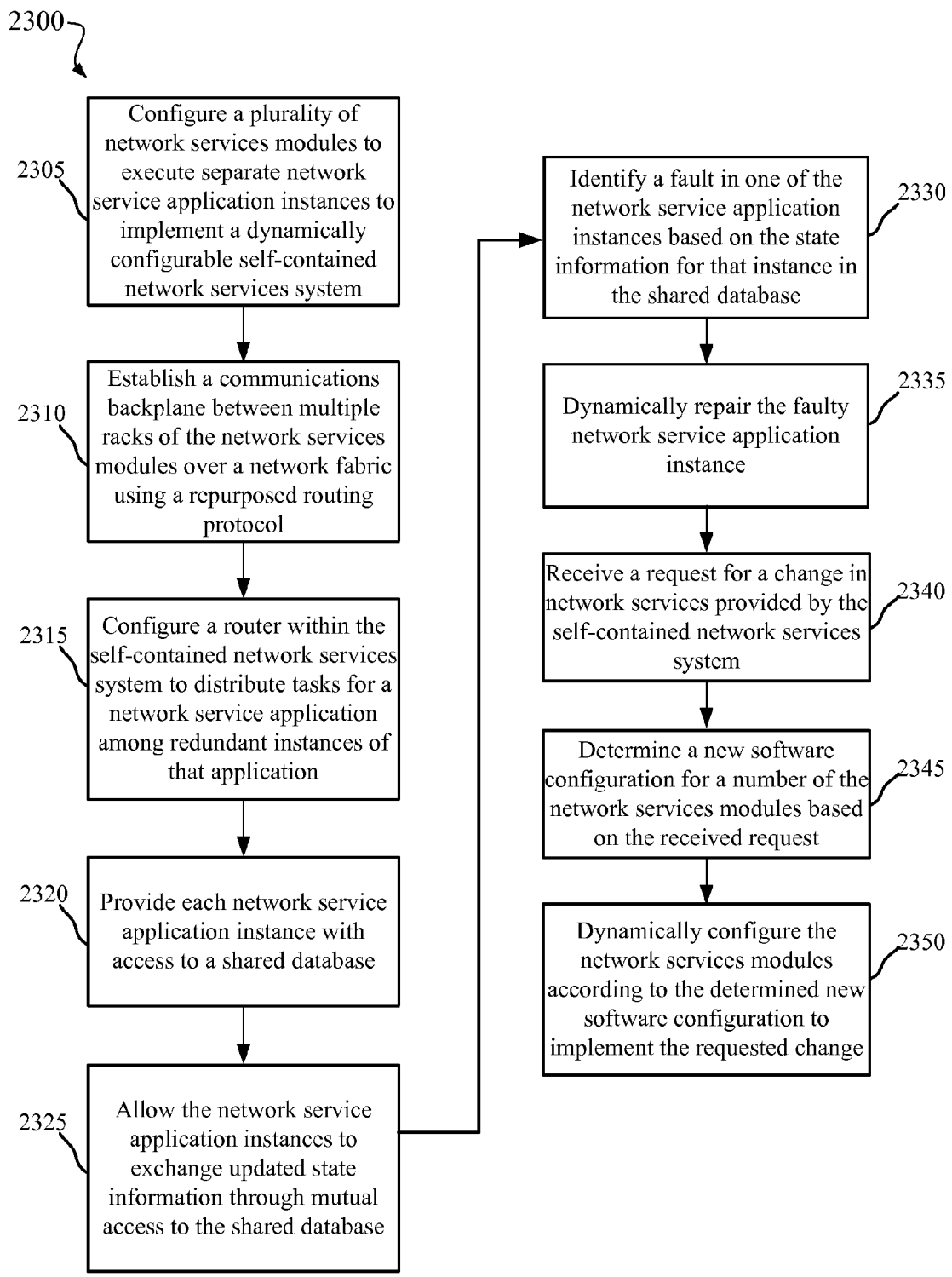
FIG. 23 is a flowchart diagram of an example of a method of managing a self-contained network services system according to various embodiments of the invention.

Referring next to FIG. 23, a flowchart is shown of another example of a method 2300 of managing a self-contained network services system. The method 2300 may be performed, for example, by one or more of the network service modules 135, the network services operating system 365, the routers 120, switches 125, or other computing devices described above with reference to the previous Figures. The self-contained network services system may be an example of the self-contained network services system 145 described above with reference to the previous Figures.

At block 2305, a plurality of network services modules may be configured to separately execute network service application instances to implement a dynamically configurable self-contained network services system. At block 2310, a virtual-chassis may be formed as a communications backplane between multiple network services modules may be established over a network fabric. At block 2315, a router within the self-contained network services system may be configured to distribute network services tasks for a network service application among redundant instances of that network service application in the self-contained network services system. At block 2320, each network service application instance may be provided with access to a shared database, and at block 2325, the network service application instances may be allowed to exchange updated state information with each other through mutual access to the shared database.

At block 2330, a fault may be identified in one of the network service application instances based on the state information for that instance stored in the shared database. At block 2335, the faulty network service application instance may be dynamically repaired. At block 2340, a request for a change in network services provided by the self-contained network services system may be received. At block 2345, a new software configuration for a number of the network services modules may be determined based on the received request. At block 2350, the network services modules may be dynamically configured according to the determined new software configuration to implement the requested change.

Figure 24:
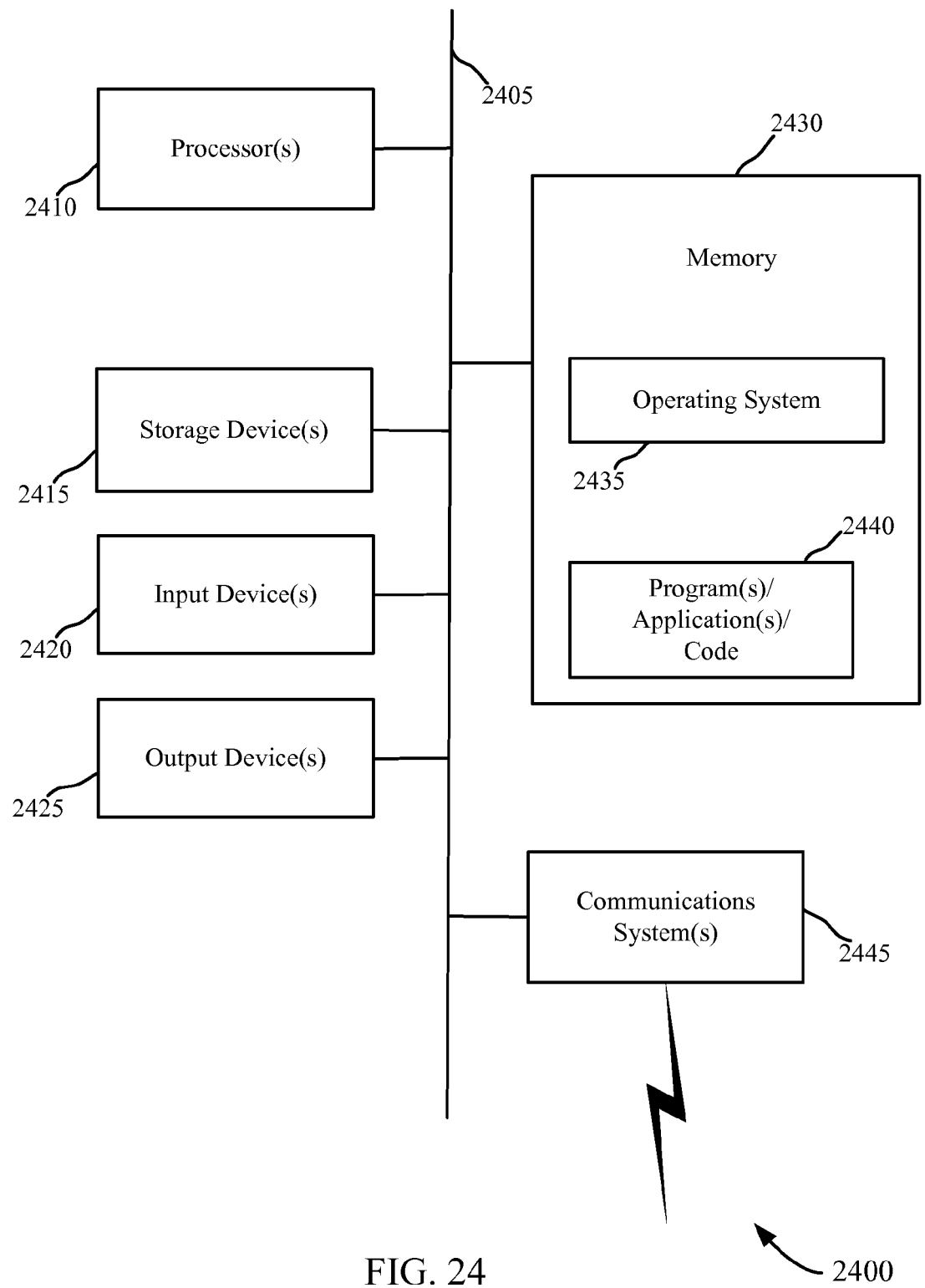
FIG. 24 is a schematic diagram that illustrates a representative device structure that may be used in various embodiments of the present invention.

A device structure 2400 that may be used for one or more components of server 130, network services module 135, self-contained network services system 145, routers 120, switches 125, or for other computing devices described herein, is illustrated with the schematic diagram of FIG. 24.

This drawing broadly illustrates how individual system elements of each of the aforementioned devices may be implemented, whether in a separated or more integrated manner. Thus, any or all of the various components of one of the aforementioned devices may be combined in a single unit or separately maintained and can further be distributed in multiple groupings or physical units or across multiple locations. The example structure shown is made up of hardware elements that are electrically coupled via bus 2405, including processor(s) 2410 (which may further comprise a digital signal processor (DSP) or special-purpose processor), storage device(s) 2415, input device(s) 2420, and output device(s) 2425. The storage device(s) 2415 may be a machine-readable storage media reader connected to any machine-readable storage medium, the combination comprehensively representing remote, local, fixed, or removable storage devices or storage media for temporarily or more permanently containing computer-readable information.

The communications system(s) interface 2445 may interface to a wired, wireless, or other type of interfacing connection that permits data to be exchanged with other devices. The communications system(s) interface 2445 may permit data to be exchanged with a network. In certain examples, the communications system(s) interface 2445 may include a switch application-specific integrated circuit (ASIC) for a network switch or router. In additional or alternative examples, the communication systems interface 2445 may include network interface cards and other circuitry or physical media configured to interface with a network.

The structure 2400 may also include additional software elements, shown as being currently located within working memory 2430, including an operating system 2435 and other code 2440, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined.

Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of managing network services, comprising:
providing network services to a client network comprising a first network fabric at a self-contained network services system implementing a number of redundant instances of a network service application, the self-contained network services system comprising a second network fabric; and
reconfiguring at least one policy-based forwarding device of the second network fabric in response to a change in the redundant instances of the network service application to distribute network service tasks received from the client network which are associated with the network service application among the redundant instances of the network service application.

2. The method of claim 1, wherein the at least one policy-based forwarding device of the second network fabric comprises a router, the method further comprising:
routing traffic between the first network fabric associated with the network and the second network fabric associated with the self-contained network services system with the router at a point of entry to the self-contained network services system;
wherein reconfiguring the at least one policy-based forwarding device of the second network fabric comprises programming the router at the point of entry to distribute the network tasks received from the client network between the redundant instances of the network service application.

3. The method of claim 2, wherein the router at the point of entry is outside an administrative control of the first network fabric.

4. The method of claim 2, further comprising:
repurposing a routing protocol at the router to distribute the network service tasks among the redundant instances of the network service application.

5. The method of claim 4, wherein the repurposed routing protocol comprises one or more of: Equal Cost Multi-Path (ECMP) routing protocol, link aggregation control protocol (LACP), or OpenFlow.

6. The method of claim 4, wherein the network service application comprises a common network address from a perspective of the first network fabric.

7. The method of claim 6, wherein the redundant instances of the network service application comprise different network addresses from a perspective of the second network fabric.

8. The method of claim 7, further comprising:
programming the router to receive the network service tasks addressed to the common network address from the first network fabric and distribute the received network service tasks among the different network addresses of the redundant instances of the network service application.

9. The method of claim 8, further comprising:
programming the router to treat the different network addresses of the redundant instances of the network service application as equally viable next hops in a network path to the common network address associated with the network service application.

10. The method of claim 2, further comprising:
using a hash-based distribution to divide the network service tasks among the redundant instances of the network service application.

11. A self-contained network services system, comprising:
a plurality of network service modules configured to implement a number of redundant instances of a network service application associated with providing network services to a client network comprising a first network fabric, the network service modules communicatively coupled with each other through a second network fabric;
wherein at least one of the network service modules comprises a network service task distribution module configured to reconfigure at least one policy-based forwarding device of the second network fabric in response to a change in the redundant instances of the network service application to distribute network service tasks received from the client network which are associated with the network service application among the redundant instances of the network service application.

12. The self-contained network services system of claim 11, wherein the at least one policy-based forwarding device of the second network fabric comprises a router at a point of entry to the self-contained network services system, the router configured to route traffic between the first network fabric associated with the network and the second network fabric associated with the self-contained network services system; and
wherein the task distribution module is further configured to program the router at the point of entry to distribute the network tasks received from the client network between the redundant instances of the network service application.

13. The self-contained network services system of claim 12, wherein the router at the point of entry to the self-contained network services system is outside an administrative control of the first network fabric.

14. The self-contained network services system of claim 12, wherein the task distribution module is further configured to:
repurpose a routing protocol at the router to distribute the network service tasks among the redundant instances of the network service application.

15. The self-contained network services system of claim 14, wherein the repurposed routing protocol comprises one or more of: Equal Cost Multi-Path (ECMP) routing protocol, link aggregation control protocol (LACP), or OpenFlow.

16. The self-contained network services system of claim 14, wherein the network service application comprises a common network address from a perspective of the first network fabric.

17. The self-contained network services system of claim 16, wherein the redundant instances of the network service application comprise different network addresses from a perspective of the second network fabric.

18. The self-contained network services system of claim 17, wherein the router is further configured to:
receive the network service tasks addressed to the common network address from the first network fabric; and
distribute the received network service tasks among the different network addresses of the redundant instances of the network service application.

19. The self-contained network services system of claim 18, wherein the router is further configured to:
treat the different network addresses of the redundant instances of the network service application as equally viable next hops in a network path to the common network address associated with the network service application.

20. The self-contained network services system of claim 12, wherein the router is further configured to:
using a hash-based distribution to divide the network service tasks among the redundant instances of the network service application.

21. A a non-transitory computer readable storage device comprising a plurality of computer readable instructions stored thereon, the computer-readable instructions comprising:
computer-readable instructions configured to cause at least one processor to provide network services to a client network comprising a first network fabric at a self-contained network services system implementing a number of redundant instances of a network service application, the self-contained network services system comprising a second network fabric; and
computer-readable instructions configured to cause the at least one processor to adapt the second network fabric to distribute network service tasks received from the client network which are associated with the network service application among the redundant instances of the network service application.

* * * * *